US006754691B1

(12) United States Patent
Gomi et al.

(10) Patent No.: US 6,754,691 B1
(45) Date of Patent: Jun. 22, 2004

(54) DISTRIBUTED SYSTEM, ACCESS CONTROL PROCESS AND APPARATUS AND PROGRAM PRODUCT HAVING ACCESS CONTROLLING PROGRAM THEREON

(75) Inventors: Hidehito Gomi, Tokyo (JP); Satoru Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 655 days.

(21) Appl. No.: 09/585,612

(22) Filed: Jun. 2, 2000

(30) Foreign Application Priority Data

Jun. 4, 1999 (JP) ........................................ 11-157214

(51) Int. Cl.[7] .............................................. G06F 15/16
(52) U.S. Cl. ..................................... 709/202; 713/201
(58) Field of Search .............................. 709/202, 285, 709/315, 330; 719/315, 330; 713/201

(56) References Cited

U.S. PATENT DOCUMENTS

| | | | | |
|---|---|---|---|---|
| 5,727,145 | A | * | 3/1998 | Nessett et al. .............. 713/200 |
| 5,903,725 | A | * | 5/1999 | Colyer ....................... 709/203 |
| 5,968,176 | A | * | 10/1999 | Nessett et al. .............. 713/201 |
| 6,012,152 | A | * | 1/2000 | Douik et al. ................ 714/26 |
| 6,070,244 | A | * | 5/2000 | Orchier et al. ............. 713/201 |
| 6,158,007 | A | * | 12/2000 | Moreh et al. ............... 713/201 |
| 6,167,520 | A | * | 12/2000 | Touboul ..................... 713/200 |
| 6,484,261 | B1 | * | 11/2002 | Wiegel ........................ 713/201 |
| 6,487,665 | B1 | * | 11/2002 | Andrews et al. ............ 713/201 |
| 6,496,871 | B1 | * | 12/2002 | Jagannathan et al. ....... 709/317 |
| 6,530,024 | B1 | * | 3/2003 | Proctor ....................... 713/201 |
| 6,553,498 | B1 | * | 4/2003 | Elgressy et al. ............ 713/201 |
| 2002/0029297 | A1 | * | 3/2002 | Cavanaugh .................. 709/315 |

OTHER PUBLICATIONS

L. Gong, Java Security Architecture (JDK1.2), Sun Microsystem, Inc., 1997–1998.
G. Karjoth et al., "A Security Model for Aglets", IEEE Internet Computing, Jul./Aug. 1997, pp. 68–77.

* cited by examiner

Primary Examiner—Bunjob Jaroenchonwanit
(74) Attorney, Agent, or Firm—Sughrue Mion, PLLC

(57) ABSTRACT

A system and a process for access controlling the agent execution, based on thread history (tracing) information, in an environment in which plural agents are run simultaneously, to protect the agent environment and the agents operating in the agent environment. When an agent 130 operating on an agent environment 140 requests execution of method to be a disclosed to another agent, the agent information 123 for the agent 130 and the agent environment information on the agent environment 140 are stored in a method execution request message, by agent environment information management means 172 and by agent environment information management means 173, respectively, whilst thread visit history information 125 on the thread of the method is stored in the thread visit history management means 174. Method transmission means 180 transmits the method to an agent environment of the method requestor. The method reception means of the agent environment of the requester receives the message. Agent execution management means of the agent environment checks into execution authorization of the requested method based on the agent information and the thread visit history information with execute access control.

23 Claims, 22 Drawing Sheets

DISTRIBUTED SYSTEM, ACCESS CONTROL PROCESS AND APPARATUS AND PROGRAM PRODUCT HAVING ACCESS CONTROLLING PROGRAM THEREON

FIELD OF THE INVENTION

This invention relates to a distributed system, an access control process and apparatus, and an access control program product. More particularly, it relates to a distributed system in which a mobile code migrates for execution on plural computers interconnected over a network, an access control process and apparatus, and an access control program product.

BACKGROUND OF THE INVENTION

Recently, as the personal computer is improved in performance and decreased in cost, and as the global scale network typified by Internet is enlarged, the configuration in which plural computers are interconnected over a network, rather than being used in a stand-alone state, is becoming more commonplace in order for a computer to exploit resources of the other remote computers through the network. With increase in the number of computers interconnected over the network, a distributed system furnishing variegated services on the network is becoming popular.

In this sort of the distributed system, there has been developed a technique in which a program code prepared on certain computer is downloaded to different computers through the network to enable the program to be executed on the computers. For example, a mobile agent system has a function of receiving and executing the program sent from other computers.

By exploiting this technique, it becomes possible to execute programs between heterogeneous computers interconnected over a network, without dependency on the computer types or the type of the operating system.

On the other hand, the possibility that the resources, such as crucial files, of a computer be accessed by an untrustable or malicious program code, is also becoming high.

For this reason, it is necessary for such distributed system to be equipped with a method and apparatus by which to distinguish a trustable program code from an untrustable program code insofar as security is concerned.

As an example of this sort of the conventional distributed system, reference is made to the description of a publication entitled "Java Security Architecture (JDK1.2)" issued by SUN-MICROSYSTEMS INC. FIG. 23 shows schematics of this conventional access control system.

Referring to FIG. 23, there is mounted in a program code 1004 a system of collating a Code Base (URL, uniform resource locator) held on the program code 1004 and a signatory of the Program code 1004 to a security policy 1003 of an own computer 1000 to permit only on program authorized to have access is allowed to operate on a virtual machine (Java virtual machine) 1001 on the own computer 1000, no matter whether the code is prepared on the own computer 1000, that is the local code, or the remote code, that is a code prepared on another computer and downloaded on the own computer 1000.

By way of a specified example, if a policy:

grant {
permission java. io FilePermission "tmp_file", "read";
} is written in the security policy 1003, the entire program codes are given the authorization to "read" a file having a filename "tmp_file".

On the other hand, if a policy:

grant "http:.//java.sun.com", signedBy "Li"{
permission java.io.FilePermission "/tmp/file*", "read";
permission java.io.SocketPermission "nec.co.jp", "connect";
} is stated, there are accorded to the program code signed by "Li" and downloaded from the URL "http.//sun.com" an authorization to read ("read") all files directly below the filename "/tmp" and an authorization to access ("connect") the network through a socket to "nec.co.jp".

In this manner, the program code realizes access control based on the URL of the computer which ha s downloaded the program code and the information on the signatory as a "subject".

As another system, there is known "A Security Model for Aglets" stated on pages 68 to 77 of a publication (IEEE Internet Computing July/August 1997). This system is called Aglets system. In this Aglets system, the subject of the security is extended not only to the information on the signatory of the program code but also to the execution environment of the program code (called "Context" or "Aglet Context" in the Aglets system), producer and the manager of the execution environment of the program code.

This enables execution of a Program code prepared by a subject not recognized by a security policy of a given computer and to perform fine access control on the condition that the authorization for execution is prescribed in detail in the security policy.

SUMMARY OF THE DISCLOSURE

However, the aforementioned access control device suffers from the following problems:

The first problem is that access control in a multi-agent system in which plural agents can have communication with one another is insufficient for the following reasons:

In a system in which agents can have communication with one another, such as Internet, an indefinite number of agents transmit/receive the communication. In such case, there is a possibility that communication with an agent causes communication with other agents to be produced, that is that the communication is of multi-stage such that the communication passes through a large number of agents or agent environments.

The more frequent the communication among agents, the higher is the possibility that communication with an untrustable agent with malicious intention participates in the communication or the communication must pass through evil agent environments. In such case, the contents of the communication tend to be modified. If the modified program code is received and executed, the agent environment tends to be affected adversely.

However, in the conventional access control device, no attention is paid to access control in case where the communication becomes multiple-staged and the number of relays is increased.

The second problem is that access control in a multiple agent system, in which agents are migrated frequently, is insufficient, for the following reason:

In certain ones of recent agents, the program code is migrated from a computer environment on a network to a different computer environment.

In certain mounting of the agent system, not only is data held by an agent is migrated, but its execution is interrupted, its state information, such as the information as to up to which number of program code in the sequence of the Program codes is executed, is saved and migration is made to a different computer environment to re-start the execution as from this state.

In a system enabling such agent migration, the probability is high that an indefinite number of agents are migrated over the network to different computer environments. Even if an agent is formulated by a trustable organization and started by a trustable person, the agent environment tends to be affected in such a case wherein the agent is migrated to a evil agent environment and modified and the agent thus modified is migrated to a different agent environment to re-initiate its execution.

In a conventional access control device, no attention is paid to the route information of the agent such that access of the agent which has visited an evil agent environment cannot be controlled appropriately.

The third problem is that access control for protecting an agent on a computer is insufficient.

The reason is that, as discussed in connection with the first and second problems, if there lacks the route information as to the route traversed by the communication or the agent, and thus the access control is insufficient, the agent which should inherently be access-controlled cannot be access-controlled such that other agents tend to be affected by execution of agents for which access control is not possible.

The fourth problem is that fine access control cannot be performed because the route information on the agent or the thread is not used as the access control subject.

The fifth problem is that, if, in a multi-agent system, access control of the agent cannot be performed sufficiently, trustability in security cannot be said to be sufficient.

It is therefore an object of the present invention to provide, in a multi-agent system in which plural agents operate simultaneously or concurrently, an access control device and process whereby it is possible to control execution of individual agents.

It is another object of the present invention to provide, in a multi-agent system in which plural agents operate concurrently and can have communication with one another, an access control device and process whereby execution of individual agents can be control led even when the communication is a multi-stage communication.

It is a further object of the present invention to provide, in a multi-agent system in which agents can migrate in a computer environment on a network to furnish variegated services on the network, an access control device and method which are highly trustable.

It is a further object of the present invention to provide an access control device and process which can Protect both the agent environment and the agent.

It is a still further another object of the Present invention to provide an access control device and process which can perform fine flexible access control adapted to the policy of each agent environment.

It is yet further object of the present invent ion to provide a multi-agent system which is highly trustable in security. Other objects of the present invention will become readily apparent from the following description and the claims.

According to an aspect of the Present invention, there is provided an access control process in which a method and/or an agent are sent from one computer to another computer over a network for execution, comprising:

holding and transmitting visit history information on agent environments of computers traversed by a method and/or an agent, collating, in an agent environment of a destined computer, the visit history information with a security Policy which defines the security information, and performing control so as not to permit execution of a method and/or an agent which has traversed an agent environment not permitted under a security policy of an own agent environment.

According to a second aspect of the Present invention, there is provided an access control process for an agent system in which a plurality of computers are interconnected over a network and in which a method disclosed by an agent of a computer is requested to be executed by an agent of another computer, comprising:

storing and holding a security policy which defines security information from one agent environment to another by each computer;

updating and holding, in a method request message, not only information on an agent of a method execution requestor but also information on an agent environment traversed by the method and visit history (or tracing) information on a thread of the method to transmit the resulting message to an agent environment of the method execution requester, and performing control in an agent environment of an addressee of the method execution request so as not to permit execution of a thread which has traversed an agent environment not permitted under a security policy on an own agent environment, by collating the visit history information of the thread of the received method request message with the security policy.

A According to a third aspect of the present invention there is provided an access control process in a mobile agent system in which an agent is migrated between agent environments of a plurality of computers interconnected over a network, comprising:

storing and holding a security policy which defines security information from one agent environment to another by each computer;

updating and holding agent environment information and agent visit history (or tracing) information in an agent migration message every time an agent traverses an agent environment; and collating, in an agent environment of a destination of agent movement, the agent visit history information of a received agent migration message with a security policy to perform control so as not to permit execution of an agent which has traversed an agent environment not permitted by the security policy of an own agent environment.

According to a fourth aspect of the present invention, there is provided a distributed system in which a plurality of computers are interconnected over a network and in which a method disclosed by an agent of a computer is requested by an agent of another computer to be executed, wherein (a) each computer includes storage means for holding a security policy which defines security information from one agent environment to another; and (b) the system comprises:

(b1) in an agent environment of a method execution requester, means for storing, in a method request message, not only agent information and agent environment information but also visit (or tracing) history information on a method thread;

(b2) in an agent environment which the method has traversed, means for holding agent environment information added to the thread visit history information of the method request message;

(b3) in an agent environment of an addressee of the method execution request, means for managing control by collating the visit history information of the thread of the received method request message with a security policy of an own agent environment so as not to permit execution of a thread which has traversed a non-permitted agent environment.

According to a fifth aspect of the present invent ion, there is provided a distributed system in which a plurality of computers are interconnected over a network and in which an agent is migrated between agent environments of the computers for execution, wherein:

(a) each computer includes storage means for holding a security policy defining security information from one agent environment to another; and (b) the system comprises:

(b1) means for adding agent visit (or tracing) history information with an agent environment to update are agent migration message each time an agent traverses the agent environment; and (b2) means for collating the agent visit history information of a received agent migration message with a security Policy of an own agent environment to check into migration authorization of the agent, thereby managing control so as not to permit execution of an agent which has traversed an agent environment not permitted by the security Policy.

Further aspects of the present invention are the features of the claims, particularly of claim 6 et seq., the entire disclosure thereof being incorporated herein by reference thereto.

Also, the entire disclosure of the original Japanese patent application No. 11-157214, the priority thereof being claimed herein, is incorporated by reference thereto.

PREFERRED EMBODIMENTS OF THE INVENTION

Figure 1:
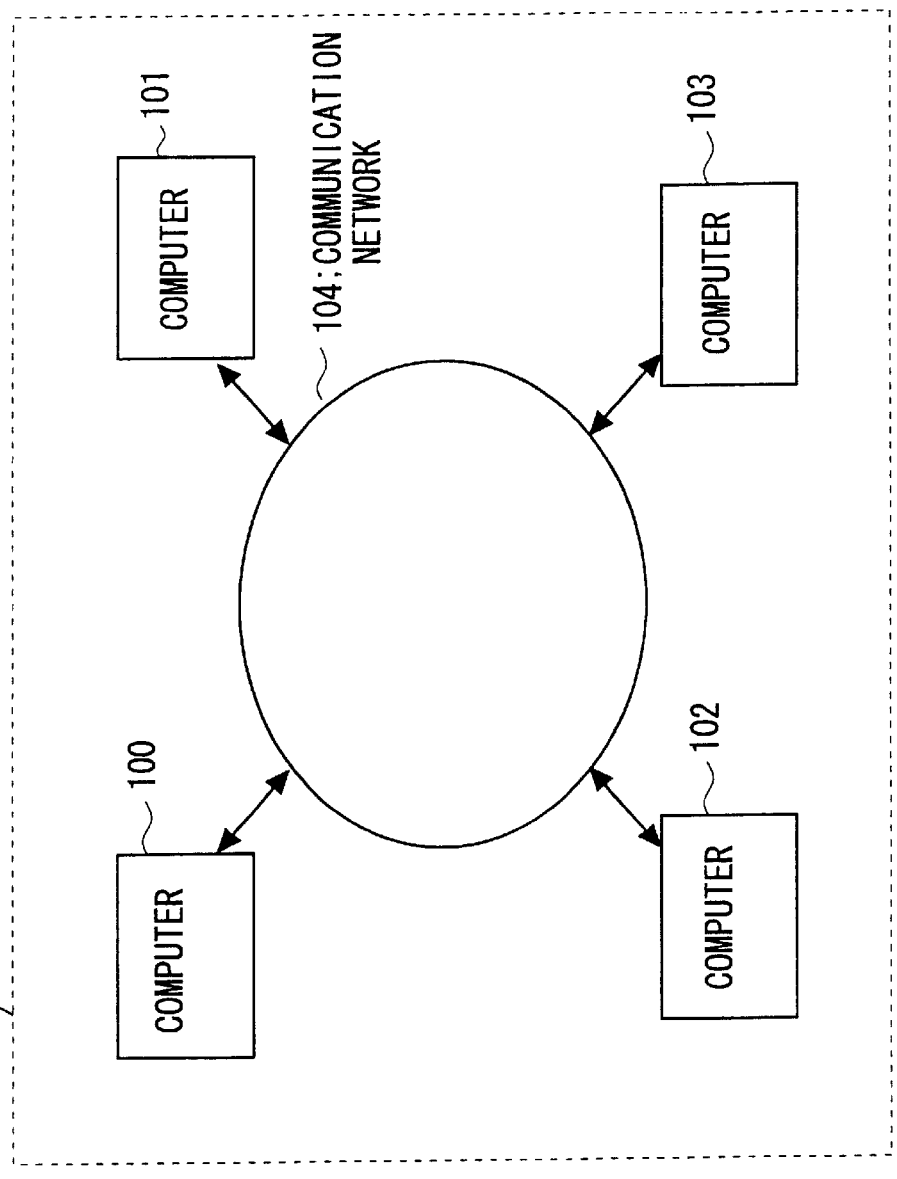
FIG. 1 shows a schematic structure of an embodiment of a distributed system according to the present invention.

A preferred embodiment of the present invention is explained in detail. It is noted that the contents of the drawings are intended to illustrate the invention without limiting the invent ion thereto. In a preferred first embodiment of the present invention, there is provided a distributed system (1 of FIG. 1) comprising plural computers (100 to 103 of FIG. 1) interconnected over a network (104 of FIG. 1. Referring to FIG. 2, each of the computers (100 to 103 of FIG. 1) has storage means (120) for storing a security policy (121) of the security information of the agent environment of an own computer, means (172, 173) for storing the agent environment information on the agent environment (140) and the agent information (123) on the agent (130) in a method request message if the agent (130) makes method execution request of a method disclosed by another agent and means (174) for storing thread visit history (tracing or hysteresis) information on the thread of the method. The method transmission means (180) transmits the information with the agent environment as the destination of method execution request. The method reception means of the agent environment as the source of request receives the message. The agent execution management means (170) of the agent environment includes means (170) for collating the agent information and the thread visit history information with a security policy of an own agent environment to check into the method executing authorization making up means for checking the method executing authorization (174). Thus the access control is executed.

In more detail, the present invention provides a distributed system having plural agent environments for executing one or more agents each having a method executing means and for managing the agent execution. Each computer includes storage means (120) for storing the security policy (121) defining the security information of the agent environment. Each agent environment includes agent generating means (160) for generating the agent, agent management means (150) for uniquely distinguishing and managing the agent from other agents in the agent environment as from generation until end of execution of the agent, execution method management means (171) for checking as to whether or not the method executed by the agent is in need of access control, agent environment information management means (173) for managing position information of the agent environment, a starter of the agent environment, a starter of the agent environment and a producer of an execution program of the agent environment, as agent environment information, upon startup of the agent environment, and collating the agent environment information with a security policy proper to the agent environment to check into authorization of executing a method of agent operating on the agent environment, agent information management means (172) for storing the information on a starter of the agent and a producer of the agent as agent information (123) upon generation of the agent in the storage means (120), and for collating the agent information to the security policy proper to the agent environment to check into the authorization of executing the method of the agent. In an agent environment for transmitting an executed thread of the method, own agent environment information is added to thread visit history (or hysteresis) information (125) on the executed thread of the method and stored as updated thread visit history information in a method request message. The thread visit history management means 174 is also provided which, upon receiving the method request message from another agent, reads the thread visit history information of the request message to collate it to the security policy of the own agent environment to check into the method executing authorization. There is also provided method transmission means (180) and method reception means (181).

When a first agent Present in a first one of the plural agent environments makes a method execution request to a second agent having a method to be disclosed to another agent, a first method transmission means (172) discriminates the agent information on the first agent environment and collates the discriminated information with the security policy of the first agent environment to check into a transmission authorization of the method for the first agent and, when the first agent has authorization to transmit the method, a first agent environment information management means (173) of the first agent environment discriminates the agent environment information on the first agent environment, and collates the information with the security policy of the first agent environment to check into the method transmitting authorization of the first agent. Then, first method transmission means (180) transmits the first agent information and an updated thread visit history information along with the method execution request to a second agent environment, the updated thread visit history information being obtained by adding the agent environment information of the first agent to the thread visit history information on an executed thread of the method of the first agent. The first method reception means (181) receives a return (reply) to the method execution request.

The second agent environment where the second agent is present includes second reception means (181) for receiving the method execution request transmitted from the first method transmission means, the first agent information and the updated thread visit history information;

second agent information management means (172) for reading the first agent information and collating the read information with a security policy of the second agent environment to check into the execution authorization of the method;

second thread visit history management means (174) for reading and discrimination the updated thread visit history information and collating the read information with the security policy of the second agent environment to check into the execution authorization of the method; and second method transmission means (180) for returning the results of execution of the method to the first agent environment.

Figure 9:
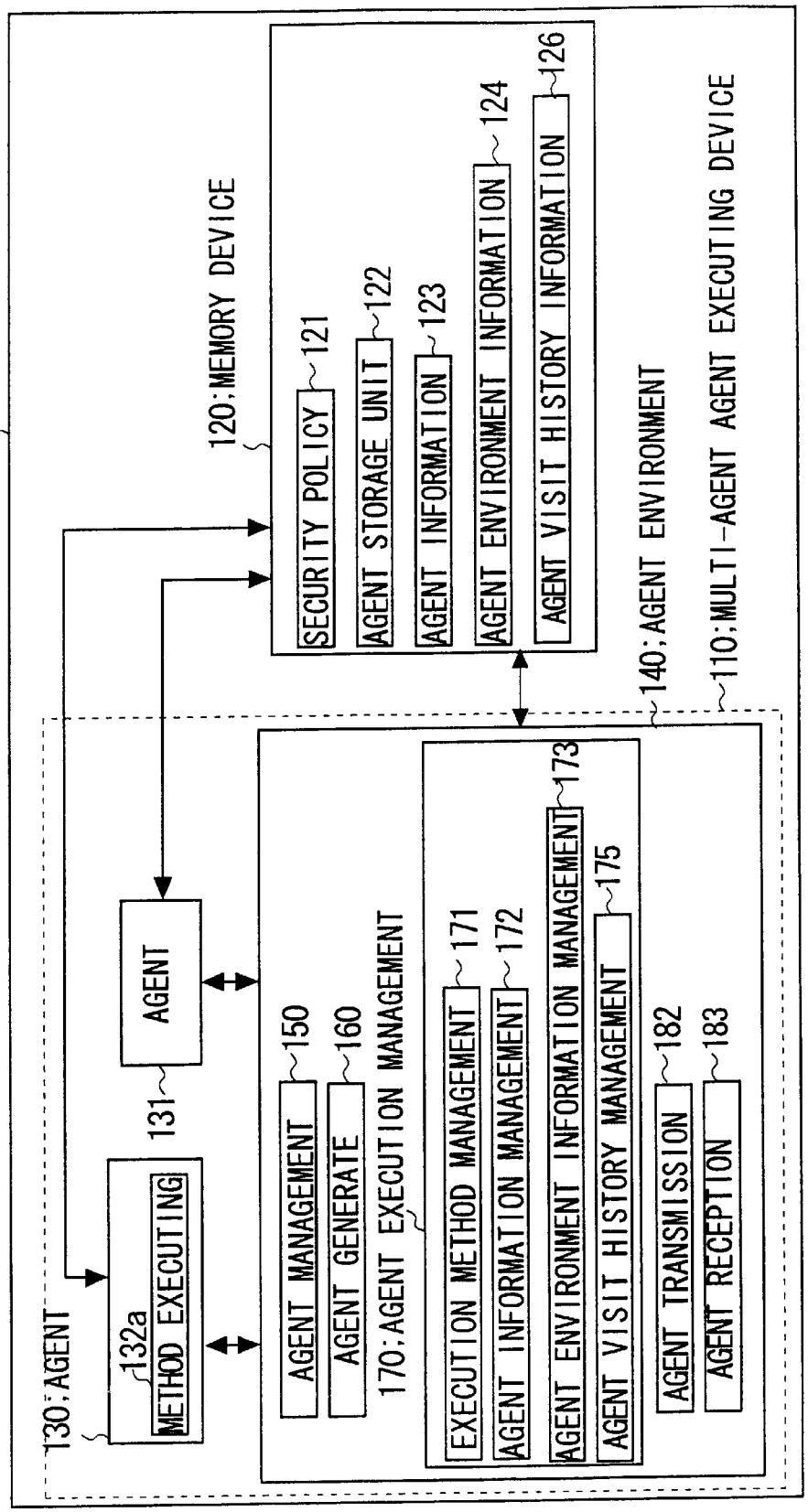
FIG. 9 illustrates the structure of a computer in a second embodiment of the present invention.

According to a second preferred embodiment of the present invention, there is provided a distributed system in which a plurality of computers are interconnected over a network. Referring to FIG. 9, each computer includes storage means (memory device) (120) for storing the security policy defining the security information of the agent environment of its own computer and agent execution management means (170) for managing the execution of an agent in an agent environment of an own computer.

The agent execution management means (170) at least includes:

means (172, 173) for referring to the security policy when an agent in an own agent environment is migrating to an agent environment of another destination of migration to check into the migration executing authorization of the agent;

means (175, 182) for adding the agent visit history information updated on addition of the own agent environment in the agent migration message in case the agent has the migration executing authorization for transmission to another agent environment, and means (175) for reading the agent visit history information upon receiving an agent migration message to collate the read information with the security policy of the own agent environment to check into the migration authorization of the agent.

In a more detailed aspect of the present invention, there is provided a distributed system having a plurality of agent environments for executing one or more agents each having method executing means and for managing execution of the agents, wherein the agent is migrated from a first agent environment where the agent operates to a second agent environment in which the agent is restored to continue the execution.

The agent environment comprises:

agent generating means (160) for generating the agent;

agent management means (150) for uniquely distinguishing and managing the agent from other agents in the agent environment as from generation until end of execution of the agent;

execution method management means (171) for checking as to whether or not the method executed by the agent is in need of access control;

agent environment information management means (173) for managing the position information of the agent environment, a starter of the agent environment and a producer of an execution program of the agent environment, as agent environment information, upon startup of the agent environment, and for collating the agent environment information with a security policy proper to the agent environment to check into the authorization of executing a method of the agent operating on the agent environment; and agent information management means (172) for storing the information on a starter of the agent and on a producer of the agent as the agent information upon generation of the agent in the storage means, and for collating the agent information to the security policy proper to the agent environment to check into the authorization of the execution method of the agent.

a first one of the agent environments comprises first agent information management means (172) for discriminating the agent information of the agent when the agent is migrating to a second agent environment to collate the agent information of the agent to a security policy of the first agent environment to check into the migration execution authorization of the agent;

first agent environment information management means (173) for discriminating the first agent environment information for collating the security policy of the first agent environment to check into a migration execution authorization of the first agent;

first agent visit history information (175) for discriminating the agent visit history information of the agent for collating the discriminated information with the security policy of the first agent environment to check into the migration execution authorization of the agent; and first agent transmission means (182) for transmitting the agent information and updated agent visit history information with the undated information to the second agent environment, along with the agent migration request, in case the agent has migration executing authorization; the updated agent visit history information being obtained by adding the agent environment information of the first agent environment to the agent visit history information of the agent by means of the first agent visit history information management means of the first agent environment.

The second agent environment includes: second agent reception means (183) for receiving the agent migration request transmitted from the first agent transmission means and the updated agent visit history information;

second agent information management means (172) for reading and discriminating the agent information and collating the information with a security policy of the second agent environment to check into the migration authorization of the agent; and second agent visit history information management means (175) for reading and discriminating the agent visit history information and collating the information with the security policy of the second agent environment to check into the migration authorization of the agent.

In a further aspect of the present invent ion, it is possible to comprise the structure and the function of the second embodiment and those of the first embodiment in combination.

Figure 16:
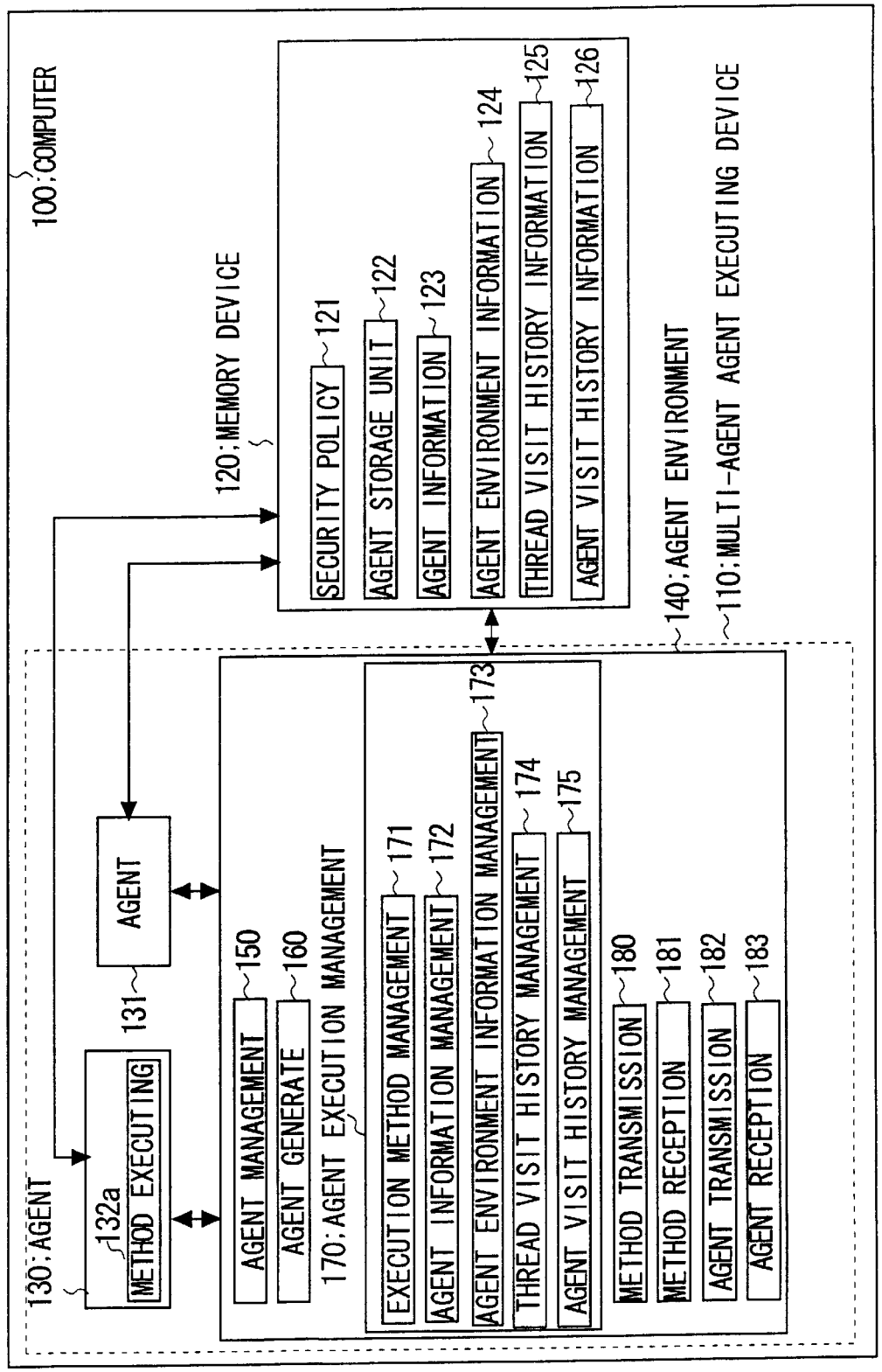
FIG. 16 illustrates the structure of a computer in a third embodiment of the present invention.

That is, in the second embodiment, now referring to FIG. 16, when a first agent present in an agent environment, where an agent making a method execution request to an agent having a method to be disclosed to another agent exists, makes a method execution request to a second agent having a method to be disclosed to another agent, a first method transmission means (172) discriminates the agent information on the first agent environment and collates the discriminated information with a security policy of the first agent environment to check into a transmission authorization of the method by the first agent, a first agent environment information management means (173) of the first agent environment discriminates the agent environment information on the first agent environment and collates the information with the method transmitting authorization of the first agent and, when the first agent has authorization to transmit the method, transmits the first agent information and an updated thread visit history information on an executed thread of the method of the first agent obtained by being added with the agent environment information of the first agent, along with the method execution request, by first thread visit history management means (174) from the first method transmission means (180) to the second agent environment. The first method reception means (181) receives a return (reply) to the method execution request.

The second agent environment where the second agent is present comprises:

second reception means (181) for receiving the method execution request transmitted from the first method transmission means, the first agent information and the thread visit history information;

second agent information management means (172) for reading the first agent information and collating the read information with the security policy of the second agent environment to check into the execution authorization of the method;

second thread visit history management means (174) for reading the updated thread visit history information for discrimination collating the read information with the security policy of the second agent environment to check into the execution authorization of the method; and second method transmission means (180) for returning the results of execution of the method to the first agent environment.

According to a further aspect of the inventor, there is provided an access control process of a distributed system in which a plurality of computers are interconnected over a network; each computer storing and holding a security policy defining the security information of each agent environment;

The access control process comprises:

(a) a step of having reference to the security policy to check into a transmission authorization of a method request when making such method execution request to another agent environment which has disclosed a method;

(b) a step of adding an own agent environment information to the thread visit history information on the method execution thread on an executed thread of the method of the agent and transmitting the updated thread visit history information by storing same in the method execution request; and (c) a step of reading the thread visit history information of the method request message upon receiving a method request from another agent and collating the read information with the security policy of the own agent environment to check into the execution authorization of the method.

According to a further aspect, there is provided an access control process having an agent environment for executing one or plural agents each having a method executing step and for managing execution of the agent, and a plurality of agent environments that manage execution the agents.

In this access control process, the agent environment comprises:

(a) an agent generating step of generating an agent;

(b) an agent management step of uniquely distinguishing and managing the agent from other agents in the agent environment as from generation until end of execution of the agent;

(c) an execution method management steP of checking as to whether or not the method executed by the agent is in need of access control;

(d) an agent environment information management step of managing position information of the agent environment, a starter of the agent environment and a Producer of an execution program of the agent environment, as agent environment information, upon startup of the agent environment, and for collating the agent environment information with a security policy proper to the agent environment to check into the authorization of executing a method of the agent operating on the agent environment; and (e) an agent information management step of storing and managing the information on the starter of the agent and on the producer of the agent Program as the agent information upon generation of the agent, and collating the agent information with the security policy proper to the agent environment to check into authorization for executing the method of the agent;

the first agent environment including:

when a first agent existing in the first agent environment makes a method execution request to a second agent having a method for disclosing to another agent;

(f) a first agent environment management step of the first agent environment discriminating the agent of the agent to the security policy of the first agent environment to check into the method transmitting authorization of the first agent;

(g) a first agent environment information management step of the first environment discriminating the agent environment information on the first agent environment for collating the security policy of the first agent environment to check into the transmitting authorization of the first agent;

(h) a first agent transmitting step of transmitting, along with the method execution request, the first agent information and updated thread visit history information to the second agent environment, in case the agent has the method transmitting authorization.

Here, updating the thread visit history information is performed by adding the agent environment of the first agent environment to the thread visit history information on the method execution thread of the first agent in the first thread visit history information management step of the first agent environment, to the second agent environment;

(i) a first method receiving step of receiving a reply (return) to the method execution request;

the agent environment in which is present the second agent including:

(j) a second agent reception step of receiving the agent execution request transmitted from the first agent transmitting step, the first agent information and the updated thread visit history information;

(k) a second agent information management step of reading and discriminating the first agent information, and collating it with the security policy of the second agent environment to check into the execution authorization of the method; and (l) a second thread visit history information management step of reading and discriminating the thread visit history information and collating the information with the security policy of the second agent environment to check into the execution authorization of the method, and (m) a second method transmitting step of returning the results of execution of the method to the first agent environment.

The processing of each step described above is carried out by a program (i.e. program product) executed on a computer. The present invention can be worked by reading the program carried on a medium, (e.g., recording medium or a transmission medium) to execute it on a computer.

In a further aspect of the present invention there is also provided an access control process of a distributed system in which a plurality of computers are interconnected over a network;

each computer storing and holding a security policy defining the security information of own agent environment;

the access control process comprising:

(a) a step of having reference to the security policy to check into the migration execution authorization of an agent lying in an own agent environment upon migration of this agent to another agent environment of a destination (addressee) of migration;

(b) a step of storing in an agent migration message the agent visit history information updated by addition of the information of the own agent environment when there is the migration execution authorization of the agent, and transmitting same to another agent environment; and (c) a step of reading the agent visit history information upon receiving the agent migration message from another agent, and collating the read information with the security policy of the own agent environment to check into the migration authorization of the agent.

According to a still further aspect, there is provided an access control process having an agent environment in which to execute one or plural agents each having a method executing step and in which to manage the execution of the agent; the method being capable of migrating the agent from a first agent environment in which the agent is in operation to a second agent environment for restoring the agent to continue the execution;

In the access control process:

the agent environment comprises:

(a) an agent generating step of generating an agent;

(b) an agent management step of uniquely distinguishing and managing the agent from other agents in the agent environment as from generation until end of execution of the agent;

(c) an execution method management step of checking as to whether or not the method executed by the agent is in need of access control;

(d) an agent environment information management step of managing position information of the agent environment, a starter of the agent environment and a producer of an execution program of the agent environment, as agent environment information, upon startup of the agent environment, and for collating the agent environment information with a security policy proper to the agent environment to check into an authorization for executing the method of the agent operating on the agent environment; and (e) an agent information management step of storing and managing the information on the starter of the agent and on the producer of the agent program as agent information upon generation of the agent, and for collating the agent information with the security policy proper to the agent environment to check into the authorization for executing the method of the agent;

the first agent environment comprises:

(f) a first agent information management step of discriminating the agent information of the agent when the agent is migrated to the second agent environment and collating the agent information with the security policy of the first agent environment to check into the migration executing authorization of the agent;

(g) a first agent environment information management step of discriminating the first agent environment information, and collating it with the security policy of the first agent environment to check into the migration execution authorization of the first agent;

(h) a first agent visit history management step of discriminating the agent visit history information of the agent to collate it with the security policy of the first agent environment to check into the migration execution authorization of the agent; and (i) a first agent transmitting step of transmitting to a second agent migration the first agent information a long with the agent migration request and the updated visit history information in the first agent visit history information of the first agent environment in case the first agent has the agent migration executing authorization, the updated agent visit history information being obtained by adding the agent environment information of the first agent environment to the agent visit history information the agent in the first agent history management step of the first agent environment; and the second agent environment in which the second agent is present comprising:

(j) a second agent reception step of receiving the agent migration request transmitted from the first agent transmitting step, and the updated agent visit history information;

(k) a second agent information management steP of reading and discriminating the first agent information, collating it with the security policy of the second agent environment to check into the migration authorization of the agent;

(l) a second agent visit history information management step of reading and discriminating the agent visit history information and collating the information with the security policy of the second agent environment to check into the migration authorization of the agent.

The aforementioned access control process may be configured as follows:

There are a first method transmission step and a first method reception step.

The first method transmission step being configured to comprise the following processing steps (m) to (p):

when a first agent present in the first one of the plural agent environments makes a method execution request to a second agent having a method to be disclosed to another agent, (m) a first agent environment management processing of the first agent environment discriminates the agent information of the agent when the agent is migrating to the second agent environment to collate the agent information of the agent to the security policy of the first agent environment to check into the method transmitting authorization of the first agent;

(n) a first agent environment information management processing discriminates the agent environment information on the first agent environment for collating the security policy of the first agent environment to check into the method transmission authorization of the first agent;

(o) a first method transmitting processing transmits to a second agent environment the first agent information, along with the method executing request, in case the first agent has the method transmitting authorization and the updated thread visit history information in the first thread visit history information of the first agent environment, the updated thread visit history information being obtained by adding the agent environment information of the first agent to the thread visit history information on the method execution thread of the first agent in the first thread visit management step of the first agent environment;

(p) the first method reception processing receives a return (reply) to the method execution request;

the agent environment in which the second agent is present comprising processing steps of (q) to (t) as follows:

(q) a second method reception processing of receiving the method execution request transmitted from the first method transmitting processing, the first agent information and the updated thread visit history information;

(r) a second agent information management processing of reading and discriminating the first agent information, collating it with the security Policy of the second agent environment to check into the execution authorization of the method;

(s) a second thread visit history management processing of reading and discriminating the updated thread visit history information and collating the information with the security policy of the second agent environment to check into the executing authorization of the method; and (t) a second method transmitting processing of returning the results of execution of the method to the first agent environment.

The processing of each step described above is carried out by a program executed on a computer. The present invention can be worked by reading the program recorded on a recording medium or a transmission medium to execute it on a computer. The program executed by the computer for each processing described above can be coded using a pre-set programming language in accordance with the processing sequence detailed hereinbelow with reference to the flow-charts shown in Preferred embodiments.

Embodiments of the Invention

Referring to the drawings, preferred embodiments of the present invention will be explained in detail.

Figure 2:
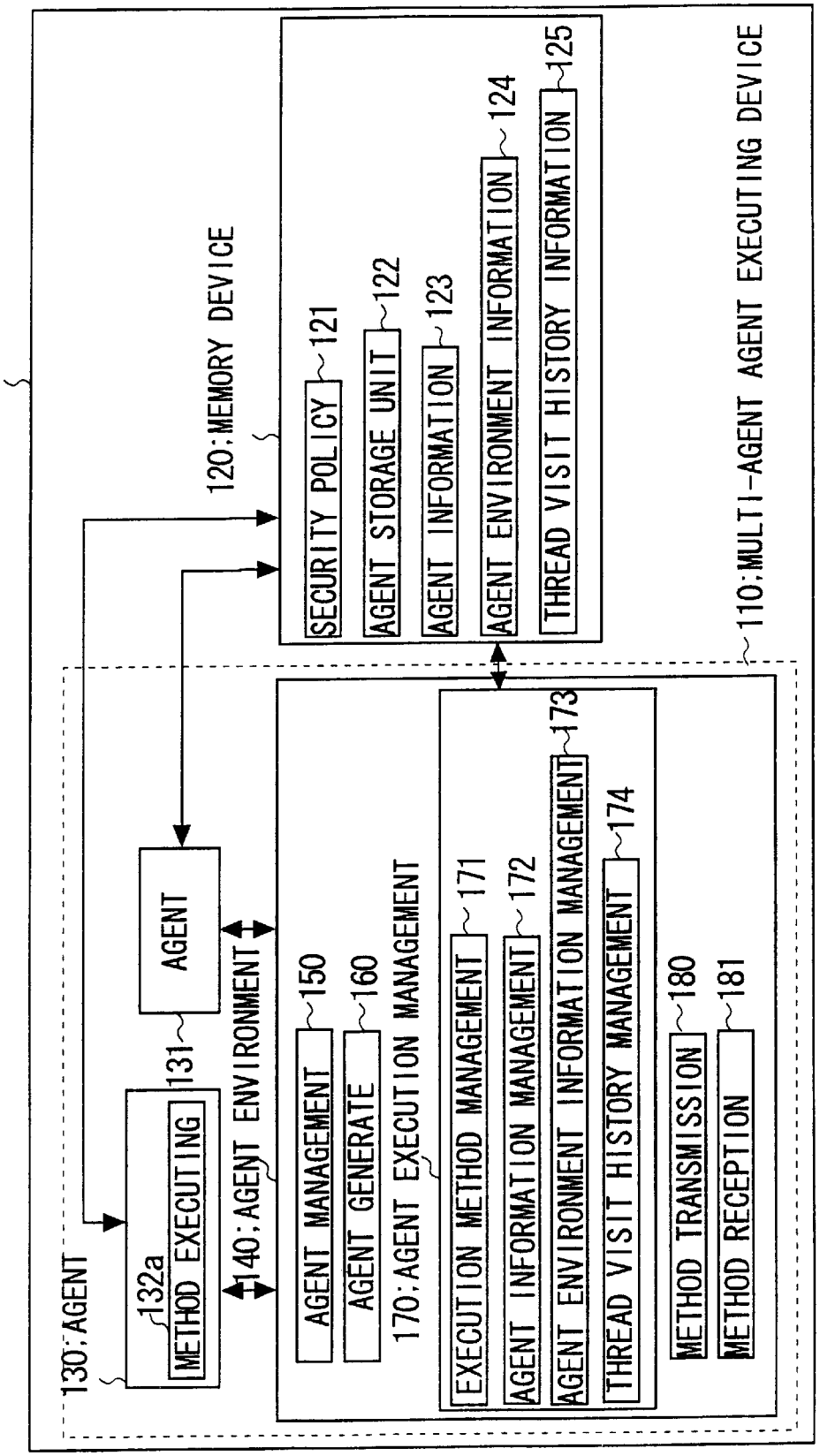
FIG. 2 shows a structure of a computer in a first embodiment of the present invention.

FIG. 1 shows the structure of a first embodiment of the present invention. Referring to FIG. 1, showing the first embodiment of the present invention, plural computers 100 to 103 are interconnected over a communication network 104 to constitute a distributed system 1.

FIG. 2 shows the structure of a computer 100 shown in FIG. 1. Referring to FIG. 2, the computer 100 includes a multi-agent executing device 110 and a storage device 120.

The storage device 120 includes computer resources, provided in the computer 100, such as a memory, a disc device or a file device.

The storage device 120 includes a storage unit for storage of a security policy 121 an agent storage unit 122, a storage unit 123 for storage of the agent information 123, a storage unit for storage of the agent environment information 124 and a storage unit for storage of the thread visit history (or hysteresis) information 125.

The multi-agent executing device 110 includes plural agents 130, 131 and an agent environment 140.

The agent 130 includes method executing means 132 for executing individual methods in a program code of the agent 130.

The methods are classified into those in need and those not in need of accessing limitation in execution. The methods in need of accessing limitation are always managed by agent execution management means 170 and inspected as to whether or not an agent to be executed is authorized to execute the methods.

The agent environment 140 includes agent management means 150, agent generating means 160, agent execution management means 170, method transmission means 180 and method reception means 181.

The agent generating means 160 generates agents 130, 140 on the agent environment 140.

The agent management means 150 allocates a sole identifier on the agent environment 140 to an agent generated by the agent generating means 160 to list the agent in a list of agents (sets of agents) operating on the agent environment 140. When the agent 130 has completed its execution, the agent 130 is re-migrated (removed) from the list of the agents and is deleted from the storage unit for the agents (i. e., from the agent storage unit 122 of the storage device 120). That is, the agent management means 150 discriminates the agent to be accessed from the set of the agents present in the agent environment 140.

When the agent 130 executes the individual methods by the method executing means 132, the agent execution management means 170 checks whether or not the method satisfies a security policy 121 prescribed from one agent environment 140 to another. If, as a result, the method satisfies the security policy 121, the agent execution management means 170 permits the execution. However, the agent execution management means 170 refrains from permitting the execution against a request for execution which trespasses (or violates) the policy 121.

The agent execution management means 170 also manages the information usable for checking into the authorization for execution.

The agent execution management means 170 includes execution method management means 171, agent information management means 172, agent environment management means 173 and thread visit history management means 174.

Of these, the execution method management means 171 scrutinizes, when the agent 130 executes the individual methods by the method executing means 132, whether or not the method is in need of access control.

When the agent 130 is generated, the agent information management means 172 stores the information on the agent 130 in the storage device 120 as the agent information 123. If the agent information 123 is needed in executing the memory access control, the agent information management means 172 reads the agent information 123 from the storage device 120 to collate it with the security policy 121.

It is noted that the agent information 123 comprises the information on a starter of the agent 130 (person or organization) or a procedure (creator or formulator) (person or organization) for the agent 130 on the agent environment 140 and, when the agent 130 is generated by the agent generating means 160, it is stored by the agent information management means 172 and invariably kept until the agent 130 completes the entire execution. The agent information 123 comprises e. g., the name of the starter of the agent, an E-mail address and an electronic signature of the starter etc.

On start up of the agent environment 140, the agent environment management means 173 stores the information on the agent environment 140 as agent environment information 124, and reads the agent environment information 124 when performing access control to collate it with the security policy 121.

The agent environment information 124 is the information on the URL (IP address, port numbers etc of a computer 100) of the agent environment 140, starter of the (person or organization) agent environment 140 or a formulator (person or organization) of the execution program of the agent environment 140. On startup of the agent environment 140, the agent environment information 124 is stored by the agent environment management means 173 and invariably kept since the startup of the agent environment 140 until the end of the execution.

The security policy 121 is the security policy proper to the agent environment 140 and prescribes the information on the storage device 120 permitting the access, the range of the permission and on the agent as the subject to which the authorization for execution is given.

In the agent storage unit 122 are stored data on the agent 130 or the status of execution from agent to agent.

An agent operating on the agent environment 140 discloses services, that is methods that can be executed by another agent, for the other agents. On reception of a request for method execution, the agent executes the methods to return the results of execution of the method to an agent as a source of request. The agent disclosing the services for the other agent is termed a "server agent".

A method request to a server agent is perpetually monitored by the agent execution management means 170 as a method in need of access control.

When an agent 130 on the agent environment 140 makes a request for executing a method disclosed by a server agent, the method transmission means 180 returns the method request based on the site of the agent environment where the server agent is present and on the server agent identifier information. Meanwhile, in order for the method transmission means 180 to be operated, a statement must be made in the security policy 121 of the agent environment 140 to the effect that communication to the agent environment where the server agent is present is to be permitted. If the permission of communication between the agent and the agent environment of the server agent is not set in the security policy 121, the method request is not executed. The server environment where the server agent is present may be the agent environment 140 or an environment other than the agent environment 140.

The method reception means 181 of the agent environment 140 receives a method request communication message transmitted from the other agent environment. It is noted however that, for executing the execution request method, permission for communication with the agent environment where the requestor agent of the method request message, termed a client agent, must be set in the security policy 121. If the permission for communication between an agent and the agent environment of the client agent is not included in the security policy 121, the method request is not received by the agent execution management means 170. In this case, the method request is not executed, but an error message is formulated and returned to the client agent.

When making a method execution request to the server agent by the method transmission means 180, the thread visit history management means 174 stores the information on the current thread (process under execution), that is the visit history information 125, in the method message, in addition to the agent information 123 and the agent environment information 124.

When the method reception means 181 has received a method request from another agent environment, the thread visit history management means 174 reads the thread visit history on the thread from the reception message to store the read history as thread visit history information 125.

Figure 3:
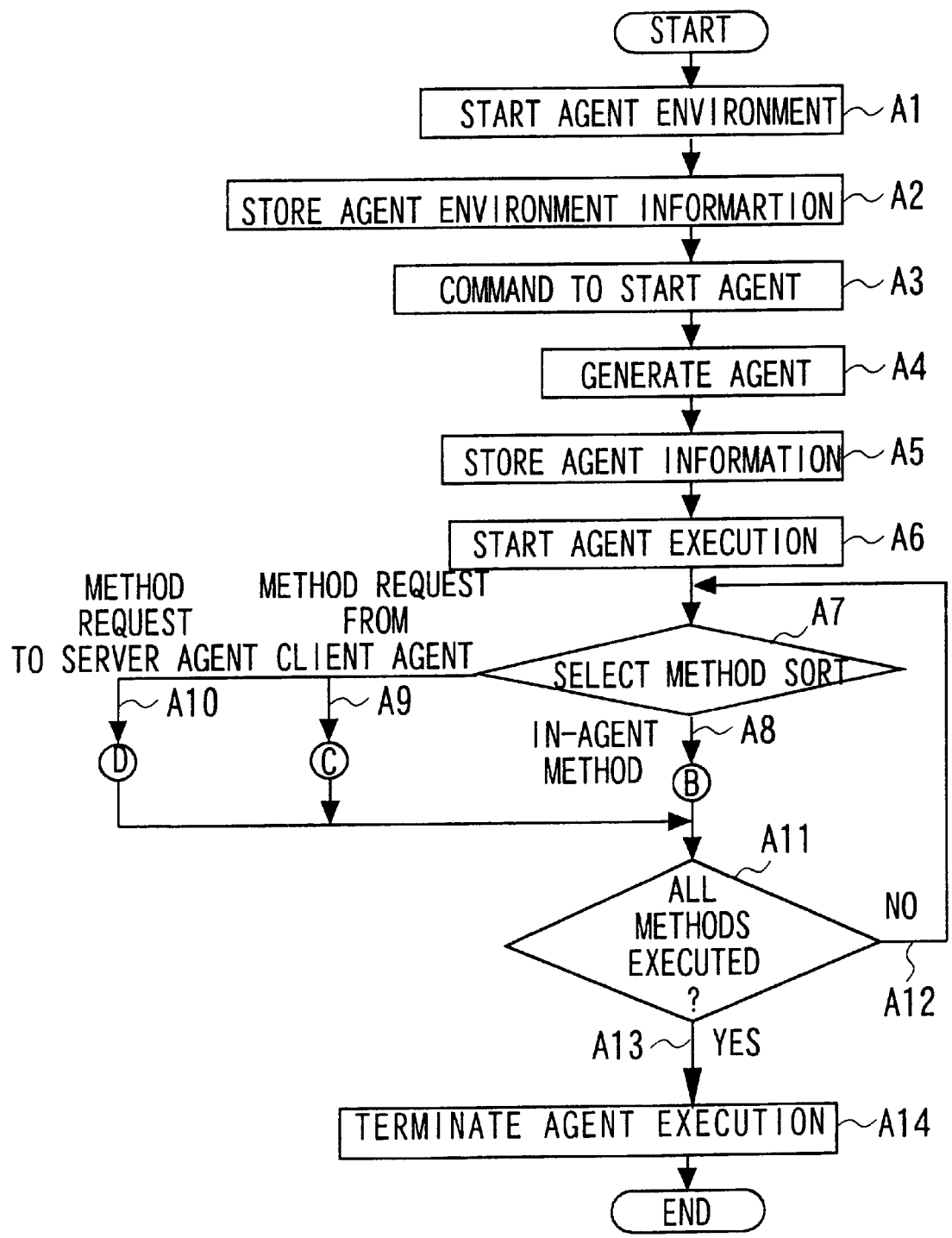
FIG. 3 is a flowchart for illustrating the operation of an agent and an agent environment in the first embodiment of the present invention.

FIG. 3 is a flow diagram for illustrating the processing by a computer in a first embodiment of the present invention. Referring to FIGS. 1 to 3, the operation of the first embodiment of the present invention is explained. The computers 101 to 103 shown in FIG. 1 are configured similarly to the computer 100. The agent 130 in FIG. 2 behaves similarly to the other agent 131.

FIG. 3 shows a flowchart for illustrating the operation as from startup of the agent environment 140 on the computer 100 shown in FIG. 2 and generation of the agent 130 until end of the execution.

First, a user on the computer 100 starts the agent environment 140 (step A1 of FIG. 3). At this time, the agent environment management means 173 on the computer 100 stores the information on the user, information on the producer of the agent environment 140 or the information on the URL etc of the computer 100 as agent environment information 124 in the storage device 120 (step A2).

Then, with the agent environment 140 started up, the user on the computer 100 issues an agent startup command (step A3).

The agent generating means 160 is responsive thereto to generate an agent 130 designated by the user (step A4). At this time, the agent information management means 172 stores the information on the user or the information on the producer of the agent 130 etc as the agent information 123 in the storage device 120 (step A5). This allows the agent 130 to start executing the method sequentially (step A6).

The agent then checks, directly before executing the respective methods, whether or not it is authorized to execute the method by the agent execution management means 170.

First, the execution method management means 171 checks whether the method is a method in the agent 130, a method request from an external agent or a method request to an external agent (step A7).

Figure 4:
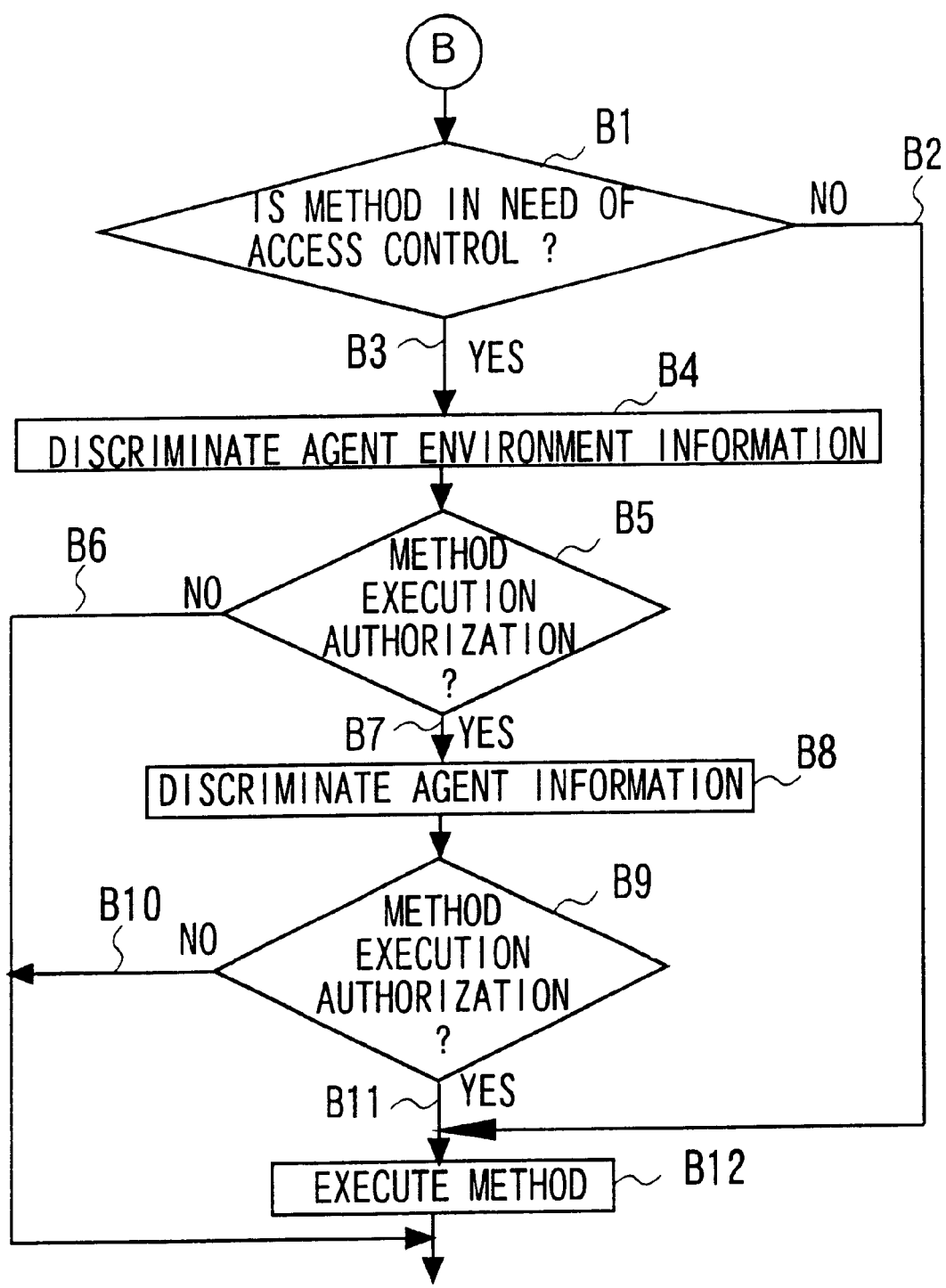
FIG. 4 is a flowchart for illustrating the operation of an agent and an agent environment (processing of in-agent method) in the first embodiment of the present invention.

If, as a result of check at step A7, the method is a method in the agent 130, the program moves to step B in FIG. 4.

Figure 5:
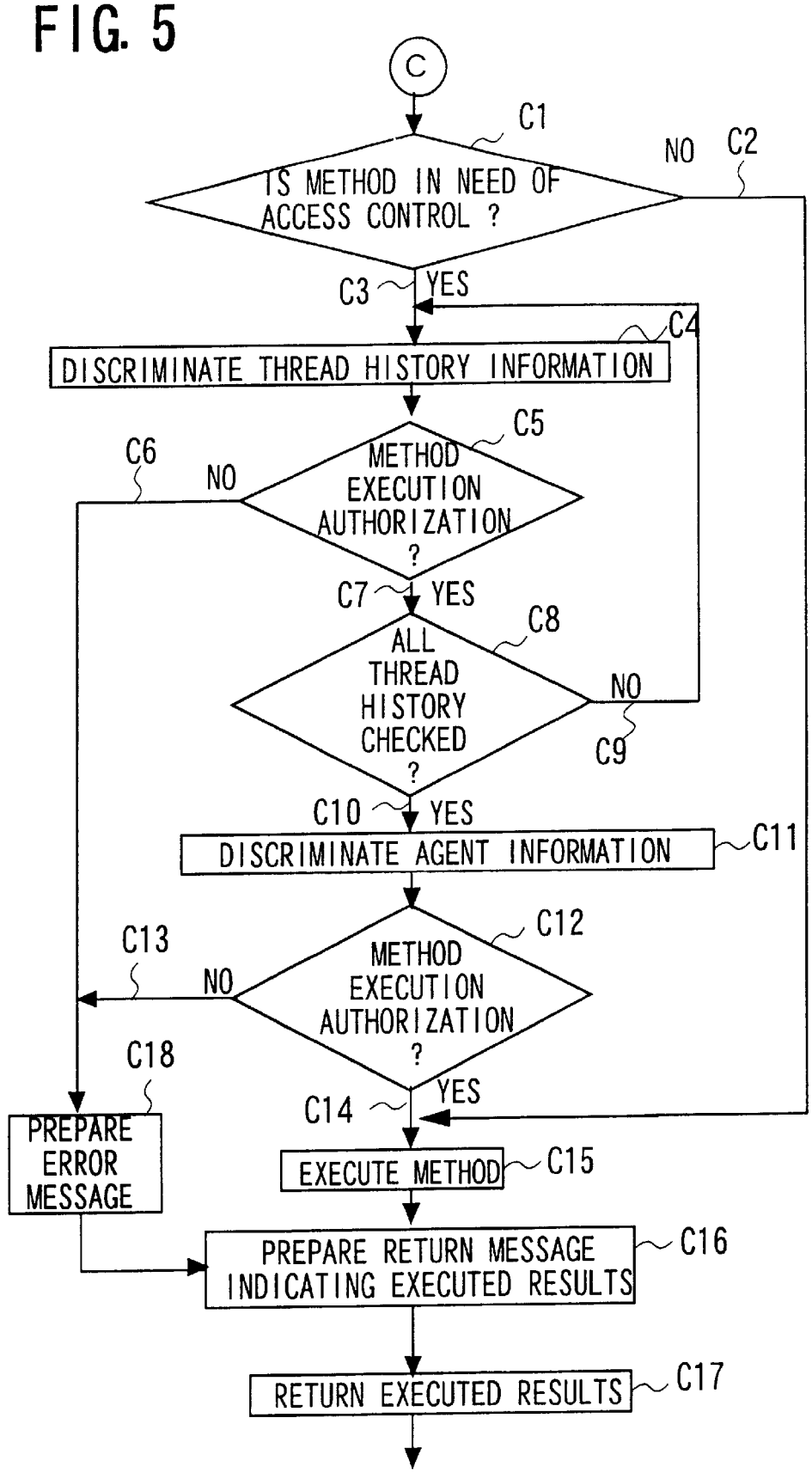
FIG. 5 is a flowchart for illustrating the operation of an agent and an agent environment (method request for a client agent) in the first embodiment of the present invention.

If the method is a method request from a client agent (source of the request), the program moves to step C in FIG. 5.

Figure 6:
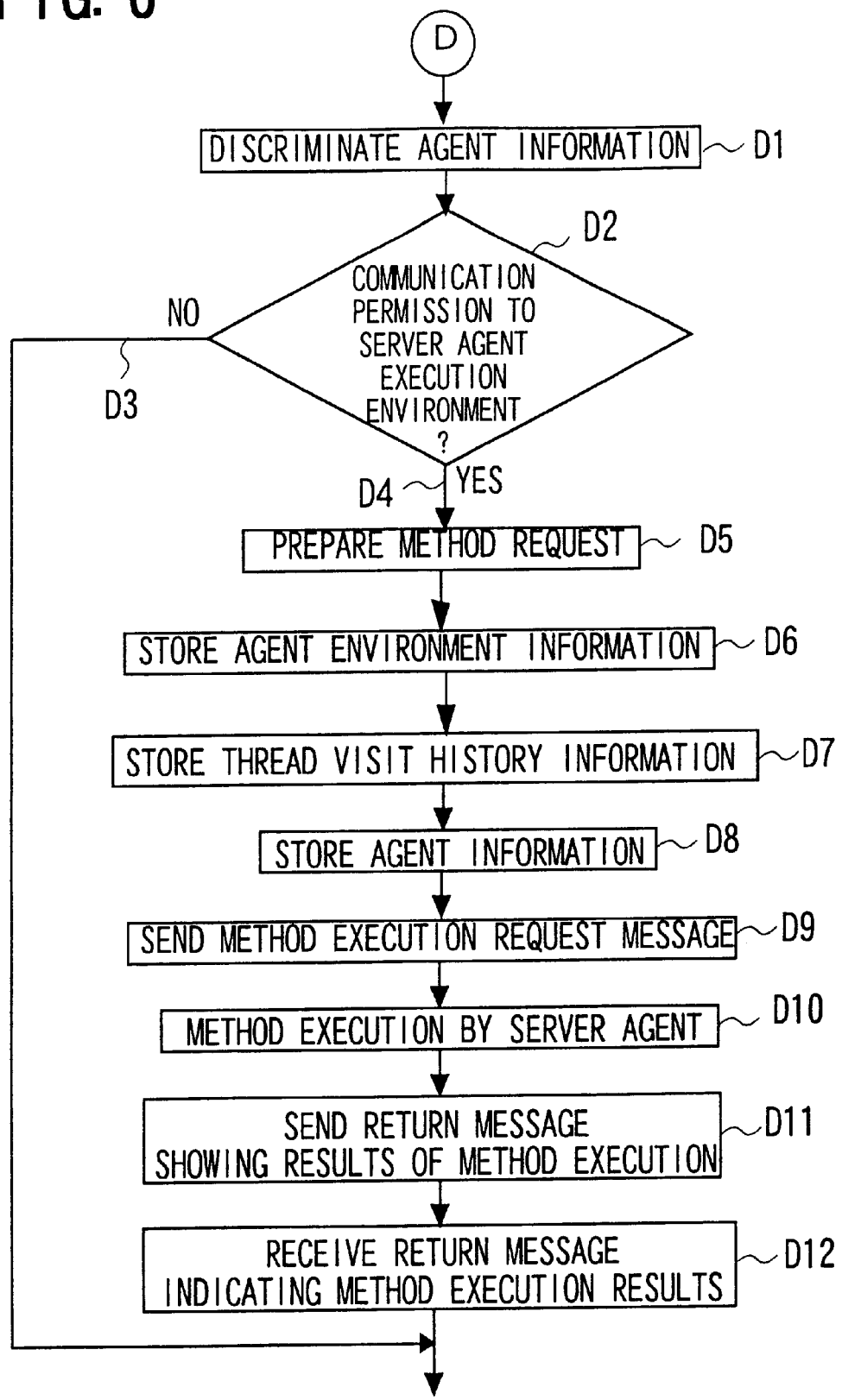
FIG. 6 is a flowchart for illustrating the operation of an agent and an agent environment (method request to a server agent) in the first embodiment of the present invention.

If the method is a method request to a server agent (step A10), the program moves to step D in FIG. 6.

FIG. 4 is a flow diagram for illustrating the pro wherein the method is a method in the agent. Referring to FIGS. 2 and 4, the processing in case the method is the method in the agent 130 is explained.

The execution method management means 171 checks as to whether or not the method is in need of access control (step B1 of FIG. 4).

If, as a result of check at step B1, the method is not a method in need of access control (branch B2), the program moves to step B12. If the method is a method in need of access control (branch B3), the program moves to step B4 and so on so that the agent execution management means 170 checks into accessing authorization of the agent 130.

First, the agent environment management means 173 reads and identifies the agent environment information 124 on the agent 130 (step B4).

The agent environment management means 173 collates the agent environment information 124 to the security policy 121 to check into the authorization for method execution (step B5).

If the agent 130 is not allowed the authorization for method execution (branch B6), the execution is not allowed, so that the method is not executed. If the agent is allowed the authorization for method execution (branch B7), the Processing transfers to the inspection of the agent information.

The agent information management means 172 reads the agent information 123 on the agent 130 (step B8) to check whether or not the agent has the authorization for execution (step B9).

If, as a result of the decision at steep B9, there lacks the authorization for method execution (branch B10), the method is not executed. If there is the authorization for method execution (branch B11), the agent executes the method (step B12).

FIG. 5 is a flow diagram for illustrating the processing in which the method is a method request from a client agent.

The execution method management means 171 checks as to whether or not the method is one in need of the access control (step C1). If the method is one not in need of access control (branch C2), the method is executed instantly (step C15), whereas, if the method is one in need of access control (branch C3), the thread visit history management means 174 reads and identifies the thread visit history information 125 (step C4) and collates the read information with the security policy 121 of the agent environment 140 to check into the method execution authorization (step C5).

If as a result of decision at step C5, there lacks the method execution authorization (branch C6), the method is not executed but an error message is formulated (step C18) and returned to the agent environment as a method requestor (step C17).

If, as a result of decision at step C5, there exists the method execution authorization (branch C7), it is checked at step C8 whether or not confirmation of the method authorization has come to an end for the entire information of the thread visit history information 125 (step C8). If the confirmation has not come to an end for the entire information of the thread visit history information 125 (branch C9), the processing reverts to step C4 to repeat the processing for confirming the execution authorization.

If, in the decision at step C8, the confirmation of the method authorization has come to an end for the entire information of the thread visit history information 125 (branch C10), the processing transfers to the confirmation of the agent information 123.

The agent information management means 172 reads and identifies the agent information 123 on the agent 130 (step C11) to check into the method execution authorization (step C12).

If, in the decision at step C12, there lacks the method execution authorization (branch C13), the method is not executed, so that an error message is formulated (step C18) and returned to the agent environment of the method requestor (step C17).

If, as a result of check at step C12, there exists the method execution authorization (branch C14), the agent 130 executes the method (step C15) and formulates a return (reply) message for the results of execution (step C16) to return the formulated message (step C17).

FIG. 6 shows a flow diagram for illustrating the processing for the case in which the method is a method request to the server agent (A10 of FIG. 3).

The agent information management means 172 reads the agent information 123 on the agent 130 (step D1) to check whether or not a method request transmission permission is set for the server agent (step D2). If there lacks the method request transmission permission (branch D3) the method is not executed.

If at the decision at step D2, there is the method request transmission Permission (branch D4), the method transmission means 180 formulates a method request message (step D5).

The agent environment management means 173 then appends the agent environment information 124 on the agent environment 140 to the request message (step D6).

The thread visit history management means 174 stores the thread visit history information 125 on the current thread in the request message (step D7). As a result, the information on the agent environment 140 is added to the thread visit history information 125 so that an updated thread visit history information is now transmitted.

The agent information management means 172 adds the agent information 123 on the agent 130 to the request message (step D8) to transmit the message to the server agent (step D9).

Method reception means of the agent environment of the server agent receives the message to perform execution processing or error processing (step D8) to transmit an execution result return message responsive to the message (step D1).

Finally, the agent 130 receives the return message from the server agent (step D12).

Figure 7:
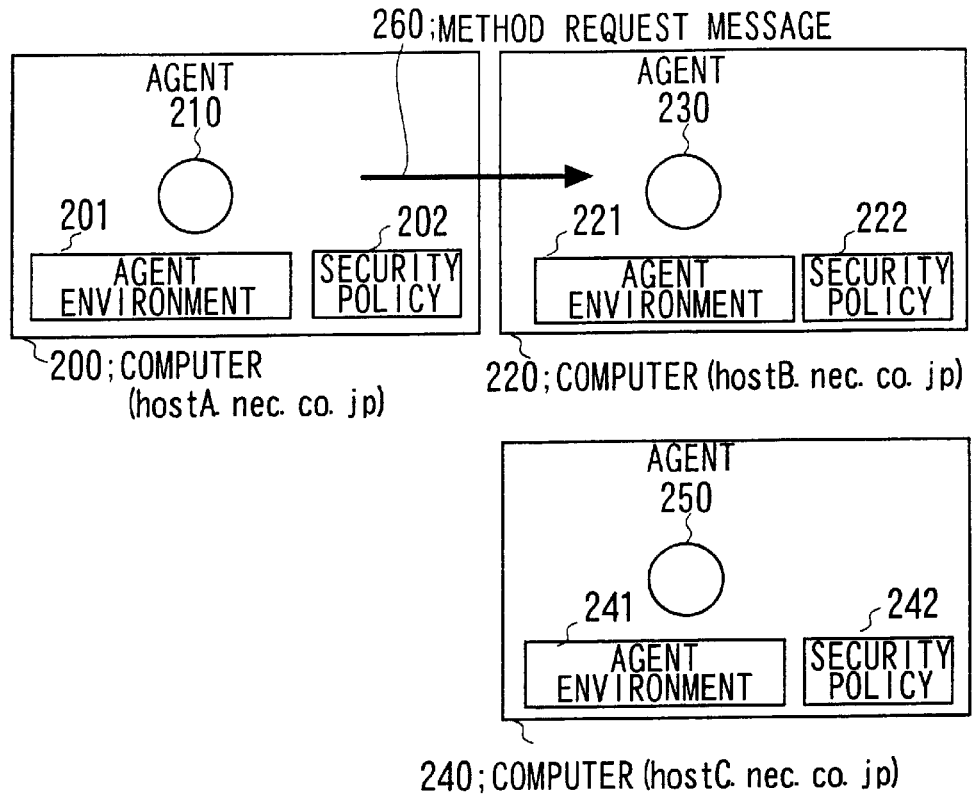
FIG. 7 is a schematic view for illustrating the first embodiment of the present invention.
Figure 8:
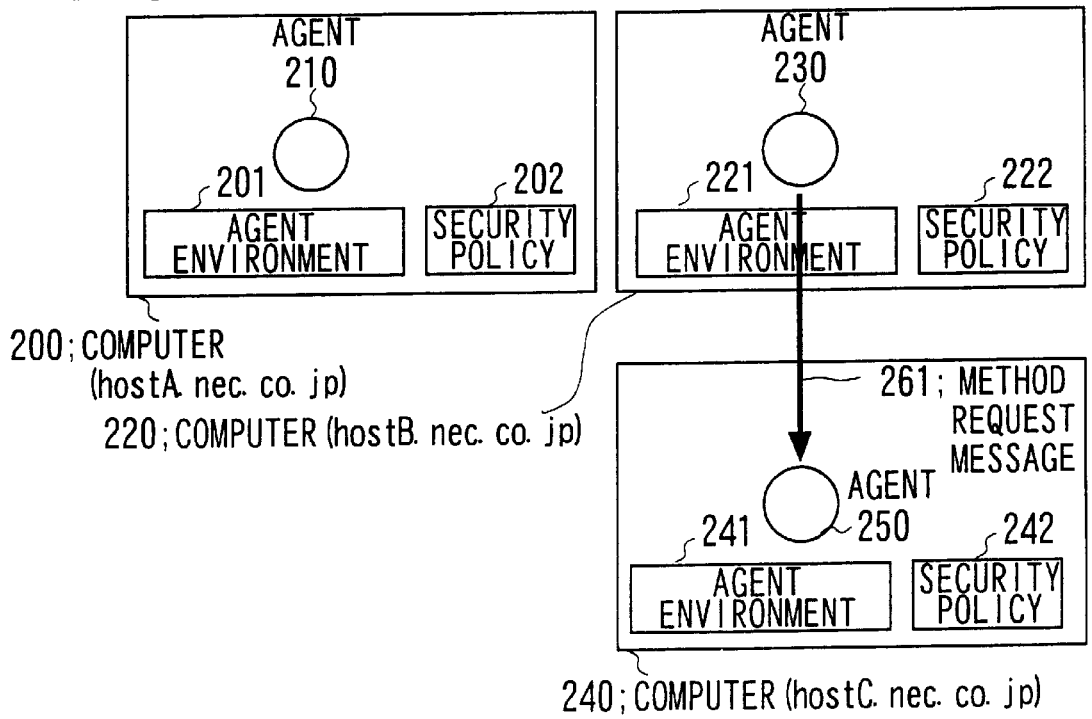
FIG. 8 is a schematic view for illustrating the first embodiment of the present invention.

Referring to FIGS. 7 and 8, a specified example of the operation in the distributed system 1 according to the first embodiment of the present invention is explained in detail.

It is assumed that the user "adminA" of a computer 200 (URL is "hostA.nec.co.jp" sets the following information on a security policy 202 to start agent environment 201.

grant code base "*.nec.co.jp"{
permission RemotePrmission "*.nec.co.jp", "CallTo, CallFrom";
}; ... (202a)
grant creator base "hostA.nec.co.jp" ownedBy "adminA" {permission RemotePermission "*.nec.co.jp", "CallTo, CallFrom";
; } ... (202b)
grant visit base "*"{
permission RemotePermission "*.nec.co.jp", "CallTo, CallFrom";
}; ... (202c)

Meanwhile, "code", "creator" and "visit" mean the subject which affords the authorization. Specifically, the "code" means a formulator of an execution program of an agent, an agent environment of the source of downloading of the agent execution program (URL, port number) and a starter of the agent environment.

The "creator" means a starter of an agent, an agent environment (URL, port number) started by the agent and a starter of the agent environment.

The "visit" means a thread, or an agent environment (URL, port number) visited by the agent and a starter of the agent environment.

"CallTo" means an operation of transmitting a method request "to" another agent, whilst "CallFrom" means an operation of receiving a method request "from" another agent.

That is, in the security policy 202, the policy (202a) accords "an authorization for the URL to transmit/receive methods to and from all agent environments contained in a domain "nec. co.jp" provided that the program for execution is an agent which has been formulated in the domain nec. co. jp. and has been downloaded".

The policy (202b) accords "an authorization to transmit/receive methods to and from all agent environments contained in a domain "nec.co.jp" to an agent started on an agent environment started by "adminA" at "hostA.nec-.co.jp".

The policy (202c) accords "an authorization to transmit/receive methods to and from all agent environments contained in a domain "nec.co.jp" to any agent started in an optional agent environment".

Also, in an agent environment 221 of a computer 220 (URL is hostB.nec.co.jp) the following information is accorded to a security policy 222:

grant code base "*", {
permission RemotePermission "*", "CallTo, CallFrom";
}; ... (222a)
grant code base "*"{
permission RemotePermission "*", "CallTo, CallFrom";
}; ... (222b)
grant code base "*", {
permission RemotePermission "*", "CallTo, CallFrom";
}; ... (222c)

That is, in the agent environment 221 of the computer 220, any agent can transmit/receive a method to and from any of other agents In an agent environment 241 of a computer 240 (URL is hostC.nec.co.jp), the following information is accorded to a security policy 242:

grant code base "*", {
permission RemotePermission "*", "CallTo, CallFrom";
permission. FilePermission "/tmp", "read"
}; ... (242a)
grant creator base "*", {
permission RemotePermission "*", "CallTo, CallFrom";
permission FilePermission "/tmp", "read"
}; ... (242b)
grant visit base "*", exceptFor "hostA.nec.co.jp" {
permission RemotePermission "*", "CallTo, CallFrom";
permission FilePermission "/tmp", "read"
}; ... (242c)

That is, if, in the agent environment 241 of the computer 240, a method call is not routed via agent environment "hostA.nec.co.jp", an authorization to read/tmp file is accorded to any agent. Moreover, any agent is authorized to transmit/receive a method.

In FIG. 7, in the computer 220, "adminB" starts the agent environment 221, according to the security policy 222 where an agent 230 having a disclosed method, started by a user "userB", is in operation.

In the computer 240, "adminC" starts agent environment 241, according to a security 242, where an agent 250 having a disclosed method, started by a user "userC" is in operation.

The user "userA" then starts an agent 210 on an agent environment 201 to transmit an execution request message for a method disclosed by the agent 230 to the agent environment 221.

In this case, the agent 210 is accorded an authorization to perform method transmission from the agent environment 201 to the agent environment 221. In this execution request message, there are stored, along with the method execution request, the agent environment information of the agent environment 201 ("adminA" and "hostA.nec.co.jp") and the agent information ("userA").

The agent environment 221 receives this execution request message to read "adminA" and "hostA.nec.co.jp" as the thread history information and also to read "UserA" as the agent information. Since the agent 230 is accorded the authorization to transmit/receive the method on the agent environment 221, the agent 230 receives the messages in succession to execute the request method.

Assume that, if the method is executed on the agent environment 221, the method request is made to the agent 250. That is, a method call is made in plural stages. The agent 230 is accorded an author i zat ion for method transmission/reception.

Referring to FIG. 8 next, a method request message is formulated to an agent 250 on the computer 240 from an agent 230 executed on an agent environment 221 on the computer 220. In this request message, there are stored the (current) agent environment information ("adminB", "hostB.nec.co.jp") and the thread visit history information up to the current time (adminA, hostA.nec.co.jp). That is, a sum-set of the agent environment information and the thread visit history information becomes a new thread visit history information. In this method request, the agent information ("userA") is also stored for transmission to the agent environment 241.

The agent environment 241 receives this message and sequentially reads the new thread visit history information. Since the method reception of a thread routed through the "hostA.nec.co.jp" is not permitted in the agent environment 241, the agent 250 formulates an error message to return the method request to the agent environment 221 without executing the method request.

The operation and the meritorious effect of the first embodiment of the present invention is hereinafter explained.

By employing an arrangement in which the security policy is defined from one agent environment to another, not only the formulator and starter of the agent of the method requestor but also any agent environment through which the method has been transmitted is preserved and updated each time the method is transmitted through the agent environment, it is possible to inhibit execution of a thread transmitted through an untrustable agent environment.

By defining the security policy derived from a unique judgment, a supervisor of each agent environment is able to realize delicate and flexible access control.

The security strength of a multi-agent system can be adjusted easily.

Moreover, the agent environment or agents operating thereon can be protected from an agent with a malicious intention such as the intension of attacking agent environments through other agent environments with a loose security to construct a safe multi-agent system.

A second embodiment of the present invention is hereinafter explained. In this second embodiment, the structure of the distributed system 1 is similar to that shown in FIG. 1. However, the structure of each computer differs from that in the first embodiment.

FIG. 9 shows the structure of a computer 100 in the second embodiment of the present invent ion. Referring to FIG. 9, as in FIG. 1, an agent 130 in the computer 100 includes method executing means 132a. An agent environment 140 includes agent management means 150, agent generating means 160, and agent execution management means 170. The agent environment 140 also includes agent transmission means 182 and agent reception means 183, in place of the method transmission means 180 and the method reception means 181 shown in FIG. 2.

The agent execution management means 170 includes, in addition to execution method management means 171, agent information management means 172 and the agent environment management means 173, agent visit history management means 175 in place of the thread visit history management means 174 shown in FIG. 2.

The storage device 120 includes, in addition to the security policy 121, agent storage unit 122, agent information 123 and the agent environment information 124, shown in FIG. 2, the agent visit history information 126.

The agent transmission means 182 and the agent reception means 183 realize the "agent migration". The "agent migration" means that an agent in operation in a given agent environment changes its operation to a different agent environment. When the agent 130 is migrated, the agent transmission means 182 collects the data on the agent 130, stored in the agent storage unit 122, into an agent migration message, which data is collectively sent to an agent environment of the destination of migration.

Depending on the implementation of the agent environment, what is migrated may encompass not only data but also the agent execution state. In this case, the information as to which number agent program as counted from the beginning to end is included in the information transmitted: to the agent environment of the migration destination.

The agent reception means 183 of the agent environment 140 receives an agent migration message transmitted from another agent execution environment, restores the agent, and stores the received data in the agent storage unit 122 of the agent environment 140 to enable re-starting of the restored agent.

When the agent migration message inclusive of the agent execution state is received upon agent migration, the agent execution state also may be restored to reinstate the agent execution in the agent environment 140 in continuation from the state in which the agent was in operation in the source (origin) of agent transmission, depending on the implementation of the agent environment.

The operation of the computer 100 in a second embodiment of the present invention is now explained in detail. In this second embodiment, the computers 101 to 103, shown in FIG. 1, are configured similarly to the computer 100, with the agent 130 and the other agent 131 operating in a similar manner.

Figure 10:
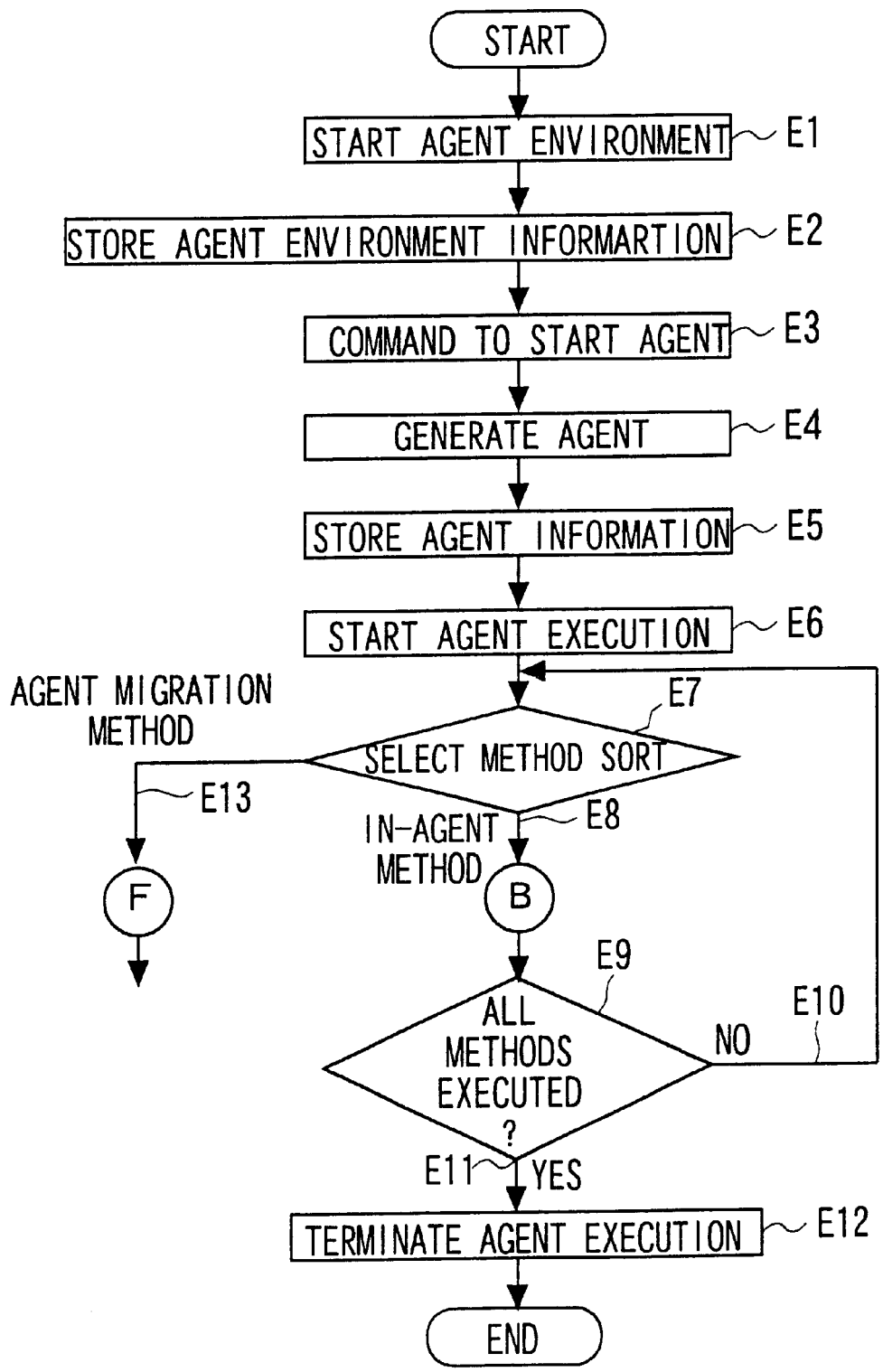
FIG. 10 is a flowchart for illustrating the operation of an agent and an agent environment in the second embodiment of the present invention.

FIG. 10 is a flowchart for illustrating the operation of the second embodiment of the Present invent ion, more specifically, the operation as from the start of the agent environment 140 and generation of the agent 130 until the end of the execution.

The steps E1 to E6 of FIG. 10 correspond to the steps A1 to A6 of FIG. 3 and execute similar processing operations.

If the agent 130, which has started the execution at step E6, is to execute respective methods, the execution method management means 171 checks into method sorts (step E7).

If, in the decision at step E7, the method is one falling within the agent 130 (E8), the processing of the step B is repeated until the methods in their entirety come to a close (steps E9 and E12).

Figure 11:
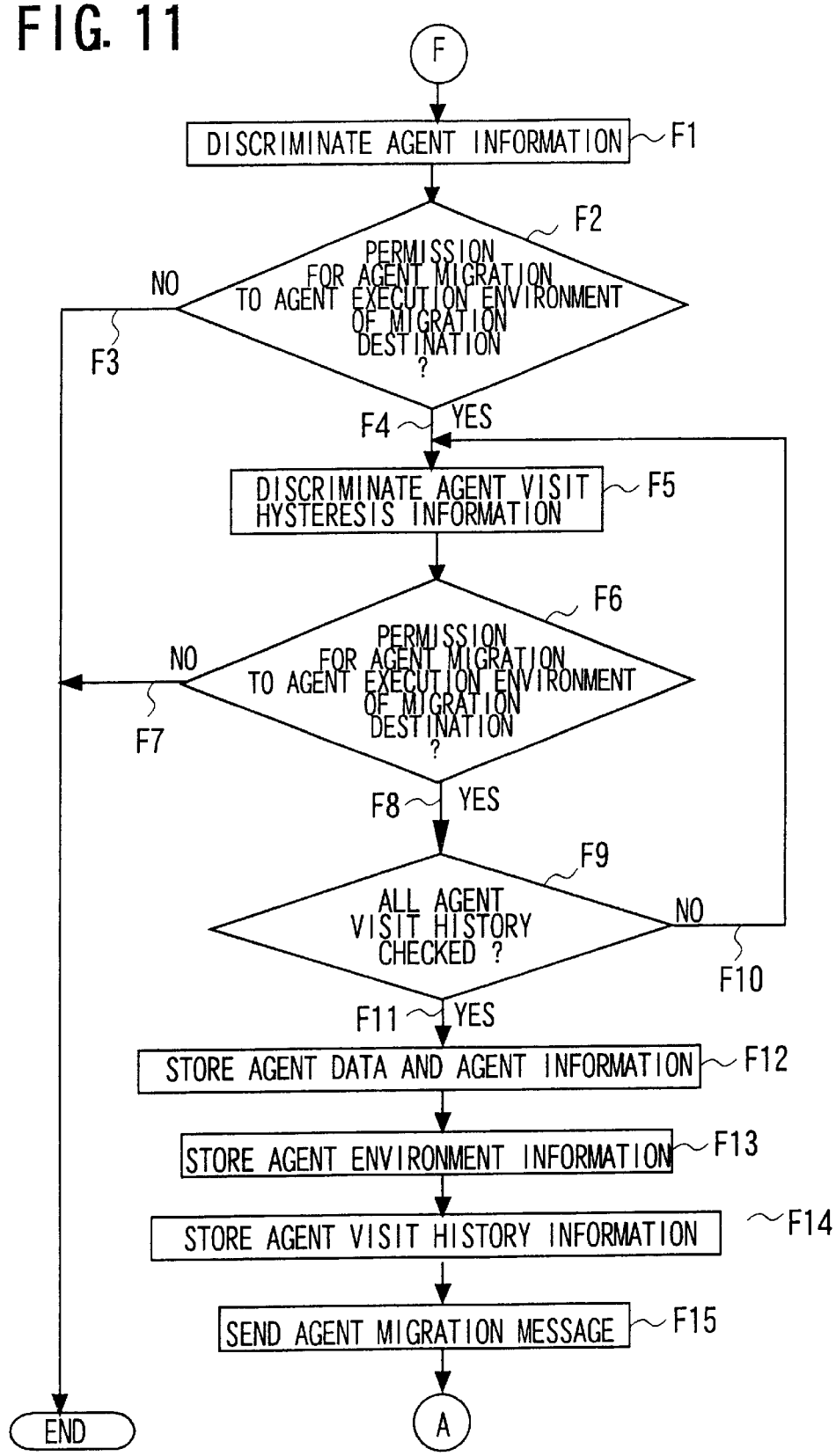
FIG. 11 is a flowchart (1) for illustrating the operation of an agent and an agent environment (agent migration method) in the second embodiment of the Present invention.

On the other hand, if the method is the agent migration method (step E13), the program moves to step F shown in FIG. 11. Meanwhile, the flow of step F is shown fractionally in FIGS. 11 and 12.

In FIG. 11, the agent information management means 172 first discriminates the agent information 123 (step F1) and collates the agent information 123 with the security policy 121 to check whether there is an authorization to cause migration of the agent 130 (step F2).

If, as a result of decision at step F2, there is the authorization to migrate the agent (branch F3), the migration method is not executed. If, as a result of decision at step F2, there is the authorization to migrate the agent (branch F4), the agent visit history management means 175 discriminates the agent visit history information 126 of the agent 130 (step F5) to check into the migration authorization for the agent 130 (step F6).

If, as a result of decision at step F6, there lacks the authorization to migrate the agent (branch F7), the migration method is not executed. If, as a result of decision at step F6, the there is the authorization to move the agent (branch F8), it is checked whether the migration authorization has been checked for the agent visit history information 126 in its entirety (step F9). If there is any agent visit history information 126 which has not been checked as to the migration authorization (branch F10), the processing of steps F5, F6 and F9 is repeated until the non-checked information ceases to exist.

If the check in its entirety has come to an end at step F10, and there is the authorization to migrate the agent 130, the agent transmission means 182 takes out (reads) data on the agent 130 from the agent storage unit 122. On the other hand, the agent information management means 172 takes out the agent information 123 to start the preparation of a migration message (step F12).

The agent environment management means 173 stores the agent environment information 124 in the migration message (step F13), whilst the agent visit history management means 175 stores the agent visit history information 126 in the migration message (step F14). This adds the current agent environment information 124 to the agent visit information 126. The updated agent visit environment information is transmitted with the migration message.

The agent transmission means 182 transmits the prepared migration message to the agent environment specified as being a destination of migration (step F15).

The agent environment of the destination of migration then is checked.

Figure 12:
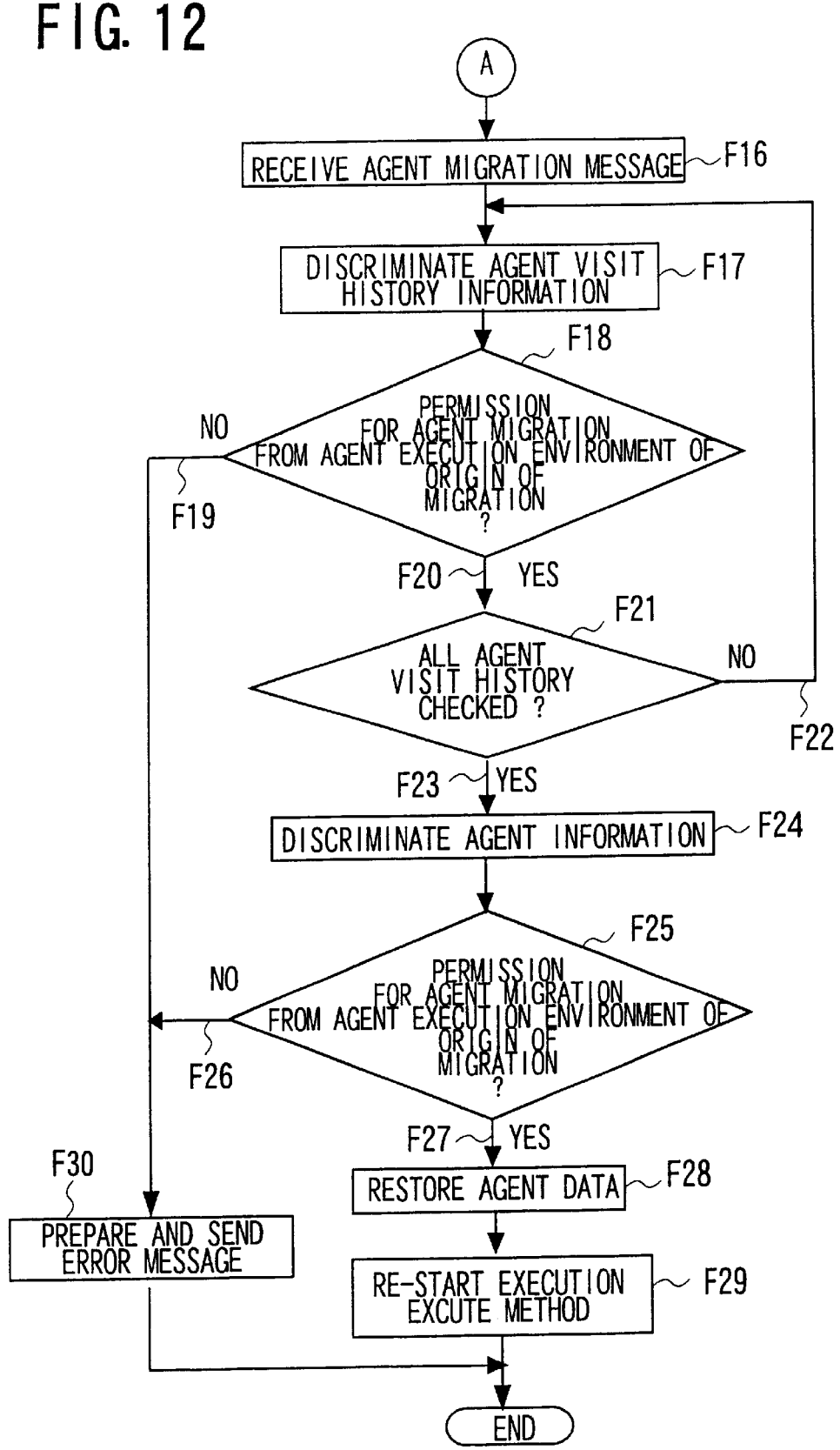
FIG. 12 is a flowchart (2), continued, for illustrating the operation of an agent and an agent environment (agent migration method) in the first embodiment of the present invention.

The agent reception means 183 of the agent environment of the destination of migration receives a transmitted migration message (step F16 of FIG. 12). The agent visit history management means 175 of the agent environment reads and identifies the updated agent visit history information in the migration message (step F17) to collate it with the security policy 121 of the agent environment to check into its authorization for execution (step F18).

If, in the check at step F18, there lacks the method execution authorization (branch F19), the agent environment returns an error message (step F30) without restoring the agent.

If, as a result of check at step F18, there is the method executing authorization (step F20), it is checked whether or not the method executing authorization has been checked on the agent visit history information in its entirety (F21). If there is unchecked information, the processing of steps F17, F18 and F21 is repeated.

If, in the decision of step F21, the method executing authorization has been checked on the agent visit history information in its entirety (branch F23), the agent information then is checked. That is, the agent information management means 172 of the agent environment reads the agent information 123 (step F24) to check into the authorization for agent migration from the agent execution environment of the destination of migration (step F25).

If, as a result of check at step F25, there lacks the authorization for executing the agent migration (F26), the agent environment returns an error message (step F30) without restoring the agent 130.

If, as a result of check at step F25, there is the authorization for executing the agent migration (F26), the agent environment permits agent migration to restore agent data (step F28).

The agent 130 then re-initiates method execution on the agent environment (step F29).

Figure 13:
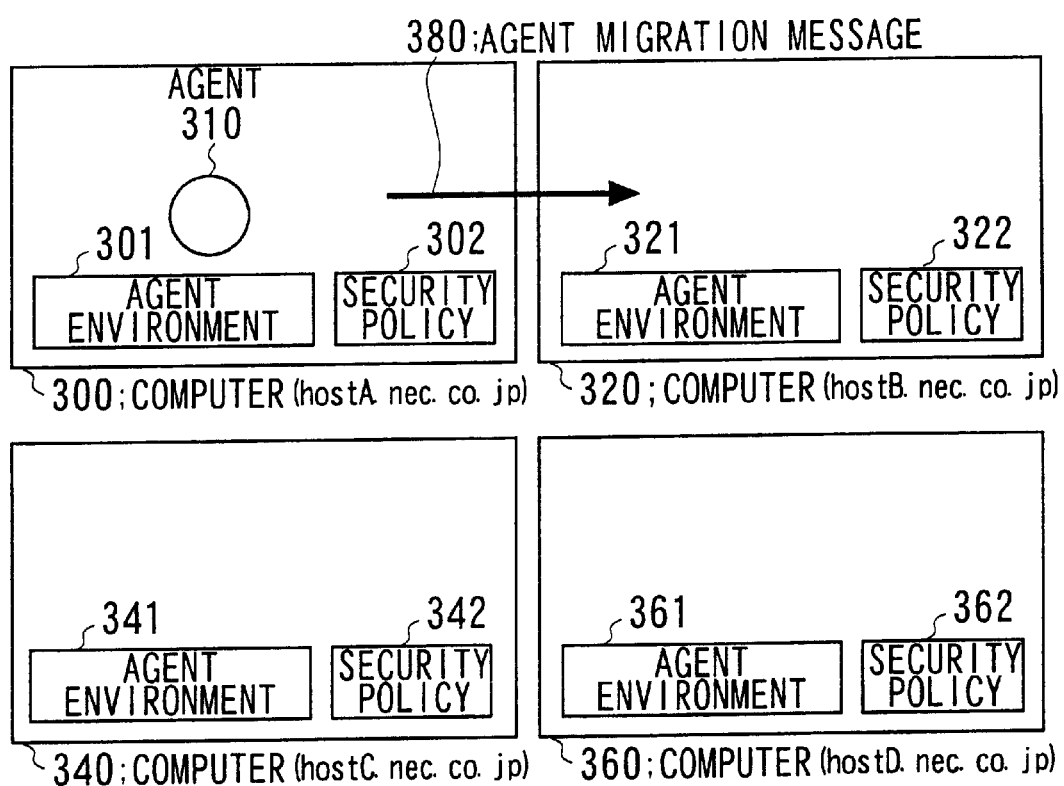
FIG. 13 is a schematic view for illustrating the second embodiment of the present invention.
Figure 14:
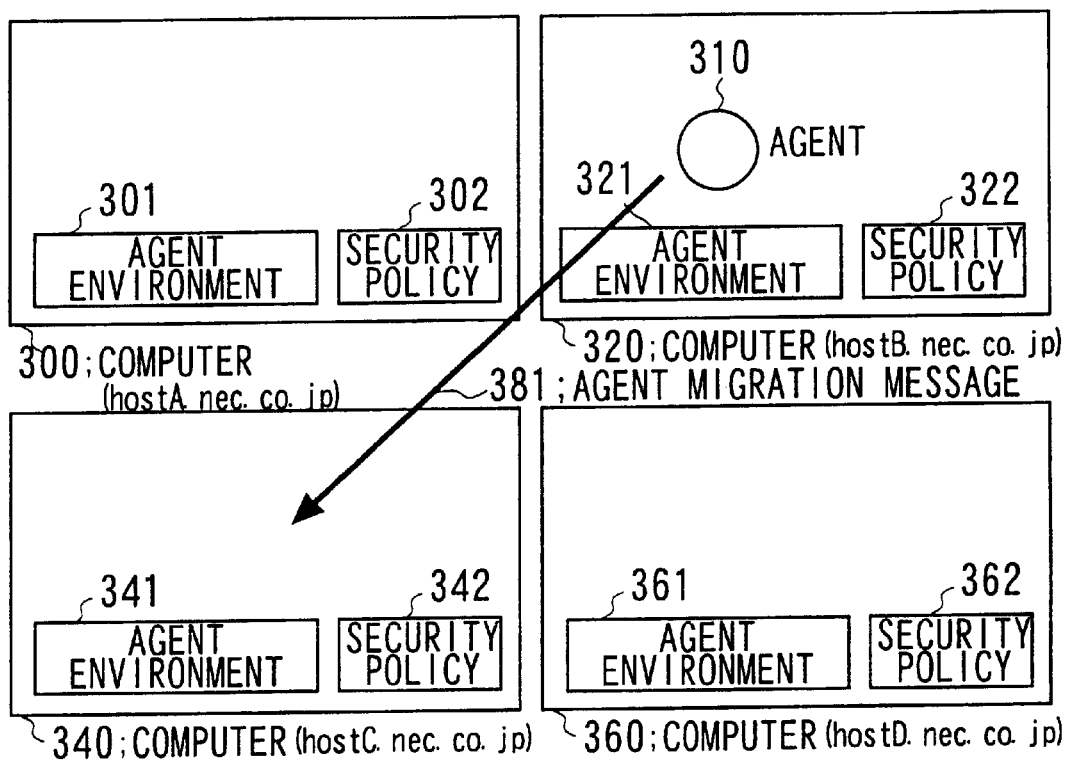
FIG. 14 is a schematic view for illustrating the second embodiment of the present invention.
Figure 15:
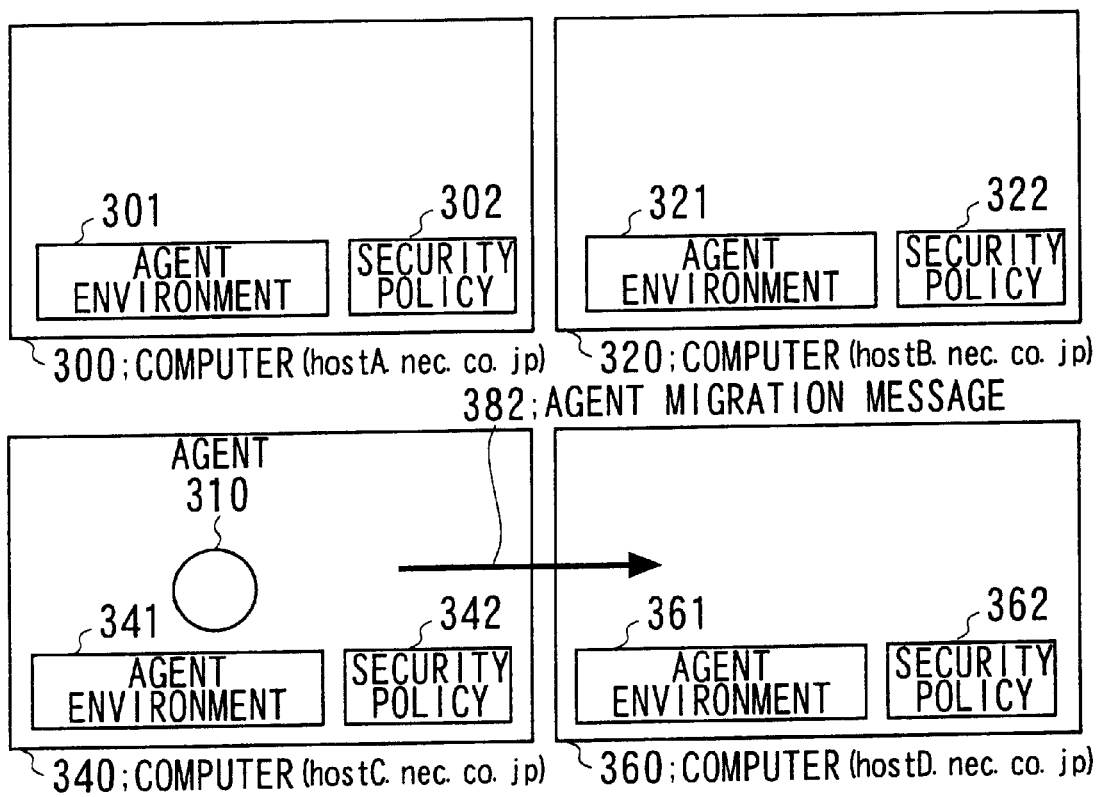
FIG. 15 is a schematic view for illustrating the second embodiment of the present invention.

Referring to FIGS. 13 to 15, the operation of the second embodiment of the present invention is explained.

Assume that, in FIG. 13, the user "adminA" of a computer 300 (URL being "hostA.nec.co.jp") sends e.g., the following information with a security policy 302 to start an agent environment 301.

grant code base "*"{
permission MigrationPermission "*.nec.co.jp", "AgentMigrateFrom, AgentMigrateTo";
}; . . . (302a)
grant creator base "*"{
permission MigrationPermission "*.nec.co.jp", "AgentMigrateFrom, AgentMigrateTo";
{; . . . (302b)
grant visit base "*"}
permission MigrationPermission "*.nec.co.jp", "AgentMigrateFrom, AgentMigrateTo";
}; . . . (302c)

It is noted that "AgentMigrateTo" denotes an operation of transmitting an agent migration message from an agent environment where the agent is located "to" another agent environment, whilst "AgentMigrateFrom" denotes an operation of receiving a migration message "from" an agent environment.

An authorization 302a in an agent environment 301 accords "authorization for an execution Program to make agent transmission/reception with the entire agent environments whose URL is comprised in a domain "nec.co.jp" in any agent prepared by any computer". An authorization 302b accords "an authorization to make transmission/reception with the entire agent environments whose URL is comprised in a domain "nec.co.jp" in any agent started on any agent environment". On the other hand, an authorization 302c accords "an authorization to make transmission/reception with the entire agent environments comprised in a domain "nec.co.jp".

It is assumed that a security policy similar to the security policy 302 has been accorded to the security policy 322 of an agent environment 321 of a computer 320 with URL being hostB.nec.co.jp and to the security policy 322 of an agent environment 341 of a computer 340 with URL being hostC.nec.co.jp.

As for the agent environment 361 of a computer 360 with URL being hostC.nec.co.jp, the following information is accorded as a security policy 362.

```
grant code base "*38 {
  permission    MigrationPermission    "*",
"AgentMigrateFrom, AgentMigrateTo";
}; ... (362a)
grant creator base "*"{
  permission    MigrationPermission    ,*",
    "AgentMigrateFrom, AgentMigrateTo";
}; ... (362b)
grant visit base "*" exceptFor "hostB.nec.co.jp" {permis-
    sion MigrationPermission "*", "AgentMigrateFrom,
    AgentMigrateTo";
}; ... (362c)
```

That is, in the agent environment 361, if the agent has not traversed the agent environment whose URL is "hostB.nec.co.jp" (exceptFor "hostB.nec.co.jp"), any agent can be migrated.

In FIG. 13, in the computer 320, the user "adminB" has started the agent environment 321 according to a security policy 322 so that an agent environment 321 is in operation. In the computer 340, user "adminC" has started an agent environment 341 in accordance with a security policy 342 so that the agent environment 341 is in operation, whereas, in the computer 360, user "adminD" has started an agent environment 361 in accordance with a security policy 362 so that the agent environment 361 is in operation.

The user "userA" on the computer 300 then starts an agent 310 on the agent environment 301.

It is noted that an execution program of the agent 310 states a program migrating in the sequence of "agent environment 301" →agent environment 321" →"agent environment 341".

First, the agent 310 executes agent migration to the agent environment 321. In this case, the agent 310 is authorized to migrate from the agent environment 301 to the agent environment 321. In the agent migration message, there are stored, along with data on the agent 310, the agent information ("userA") and the agent environment information of the agent environment 301 ("adminA", "hostA.nec.co.jp").

The agent environment 321 receives the agent migration message to check into the migration author ization from the agent visit history information ("adminA", "hostA.nec.co.jp") and the agent information ("userA").

Since the agent environment 321 receives any agent migration, agent migration to the agent environment 321 of the agent 310 is permitted so that the agent is restored from the agent migration message to re-start the execution.

In FIG. 14, the agent 310 attempts to execute the agent migration to the agent environment 341. Since agent migration to any agent environment is Permitted in the agent environment 321, the agent environment 321 starts preparing an agent migration message. In this case, there are stored the agent information ("userA"), agent environment information ("adminB", "host B.nec.co.jp") and the agent visit history information ("adminA", "hostA.nec.co.jp"), in addition to the data on the agent 310, in the agent migration message. It is this agent migration message that is transmitted to the agent environment 341.

The agent environment 341 receives the agent migration message to check into the authorization for migration from the agent information ("userA"), agent visit history information ("adminB", "hostB.nec.co.jp", "adminA", "hostA.nec.co.jp").

Since any agent migration is received in the agent environment 341, agent migration to the agent environment 341 of the agent 310 is permitted to restore the agent and to re-initiate the execution.

In FIG. 15, the agent 310 attempts to execute agent migration to an agent environment 361. Since agent migration is allowed to any agent environment in the agent environment 341, the agent environment 341 starts to prepare an agent migration message. In this case, there are stored the agent information ("userA"), agent environment information ("adminC", "hostC. nec. co.jp"), the agent visit history information ("adminB", "hostB.nec.co.jp" and "adminA", "hostA.nec.co.jp"), in addition to the data on the agent 310, in the agent migration message. It is this agent migration message that is transmitted to the agent environment 361.

The agent environment 361 receives the agent migration message to check into the migration authorization from the agent information ("userA"), agent visit history information ("adminC", "hostC.nec.co.jp"; "adminB", "hostB.nec. co.jp" and "adminA", "hostA.nec.co.jp").

Since the agent which has traversed the agent environment of "adminB", "hostB.nec.co.jp" has no authorization, the agent environment 361 returns an error message without permitting reception of the agent 310.

The operation and the meritorious result of the second embodiment is now explained.

Since the present second embodiment is configured for adding (incrementing) and saving an agent environment for agent migration each time an agent migration occurs, so that it is possible to inhibit execution of a specified method to an agent which has visited an untrustable agent environment.

As a result, the agent environment can be protected to construct a trustable multi-agent system.

It is moreover possible to prevent leakage of confidential information on the agent environment to construct a system with improved security.

By defining the security policy derived from a unique judgment, a supervisor of each agent environment is able to realize delicate and flexible access control.

The security strength of a multi-agent system can be adjusted easily. Moreover, the agent environment or agents operating thereon can be protected from an agent with a malicious intention such as the intension of attacking agent environments through other agent environments of loose security to construct a safe multi-agent system.

A third embodiment of the present invent ion is hereinafter explained. In this third embodiment, the structure of the distributed system 1 is similar to that shown in FIG. 1. FIG. 16 shows the structure of a computer in the present third embodiment, in which the computers making up the distributed system differs from that in the second embodiment. In FIG. 16, the agent 130 is similar to that shown in FIG. 9.

Referring to FIG. 16, the agent environment 140 includes agent management means 150, agent generating means 160, agent execution management means 170, method transmission means 180 and method reception means 181.

The agent execution management means 170 includes execution method management means 171, agent information management means 172, agent environment information management means 173, agent visit history management means 175, and the thread visit history management means 174 of the aforementioned first embodiment.

The storage device 120 includes storage units for a security policy 121, an agent storage unit 122, an agent information 123, an agent environment information 124, an agent visit history information 126, and the thread visit history information 125 of the above-described first embodiment, respectively.

The computers 101 to 103 operate similarly to the computer 100, whilst the agent 130 operates similarly to the other agent 131.

In the absence of the agent migration, the agent 130 of the 3rd embodiment performs an operation similar to that of the first embodiment.

Figure 17:
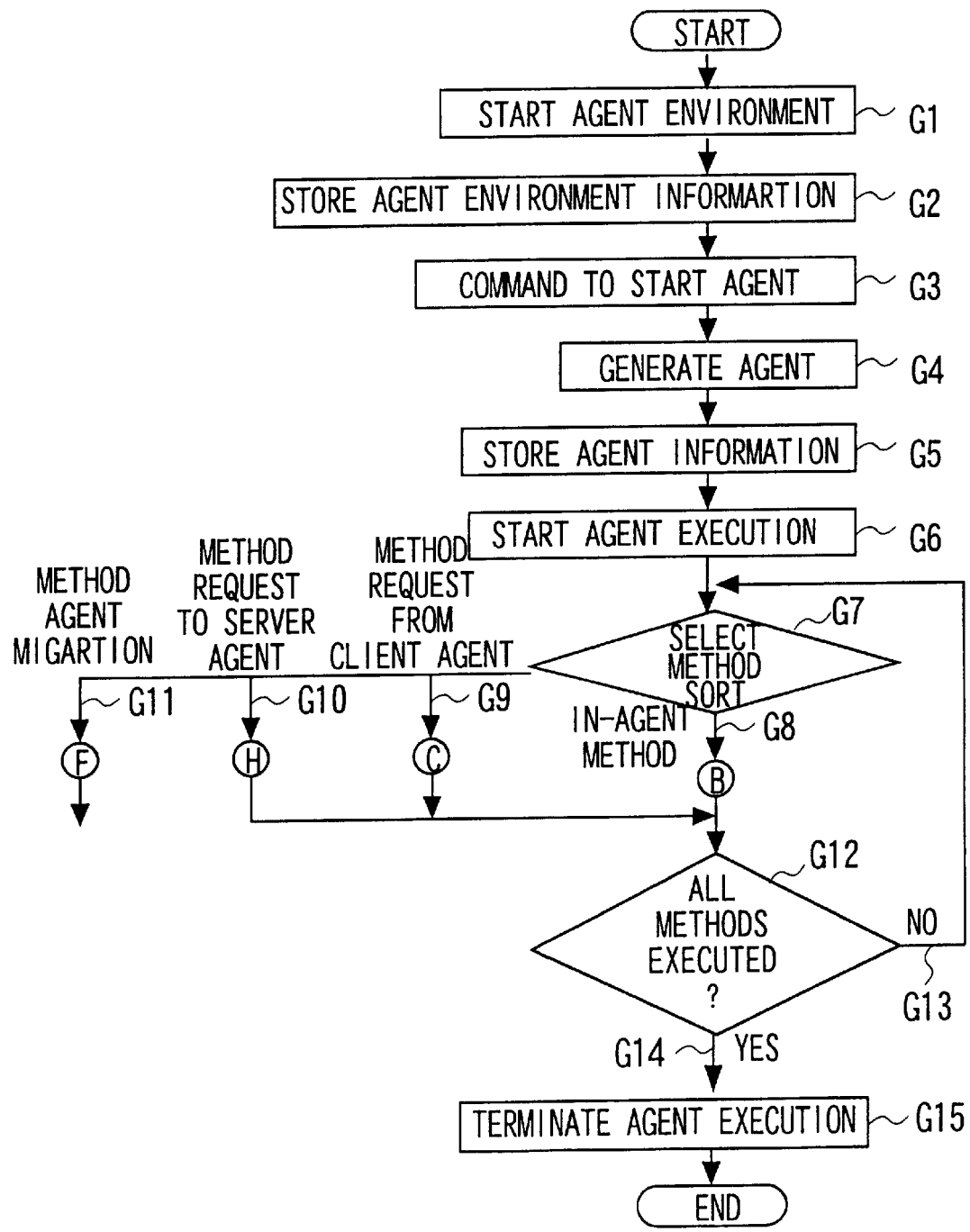
FIG. 17 is a flowchart for illustrating the operation of an agent and an agent environment in the third embodiment of the present invention.

FIG. 17 shows a flowchart for illustrating the agent environment and the agent operation of the third embodiment in case the agent migration is included in the agent program.

The steps G1 to G6 of FIG. 17 correspond and operate similarly to the steps A1 to A6 of FIG. 3.

When the agent 130 which has started the execution at step G6 attempts to execute the respective methods, the execution method management means 171 checks into method sorts (step G7).

If the method is one falling within the agent 130 (step G8), the processing proceeds to step B of FIG. 4.

On the other hand, if a method is a method request from a client agent (step G9), the program moves to step C shown in FIG. 5.

If the method is a method request to the server agent (step G10), processing transfers to step H of FIG. 8.

Figure 18:
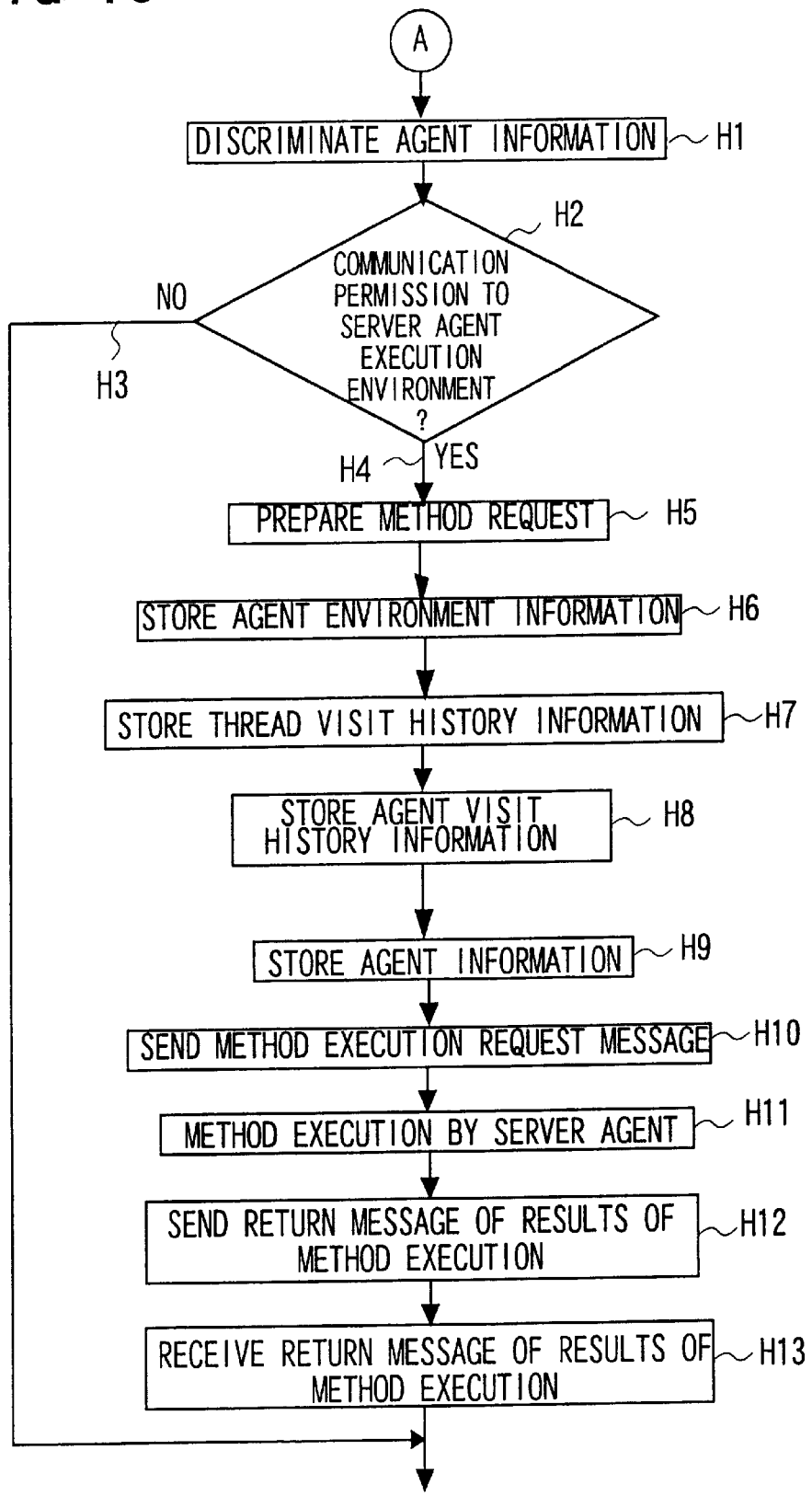
FIG. 18 is a flowchart for illustrating the operation of an agent and an agent environment (method request to a server agent) in the third embodiment of the present invention.

The flowchart of FIG. 18 is similar to that of FIG. 6, except addition of a step H18.

At step H7, the thread visit history information is stored in the method request message. At step H8, the agent visit history information is added. That is, the sum-set of the thread visit history information and the agent visit history information becomes a new thread visit history information of the method, which is transmitted to the method requestor. The operation of FIG. 18 is otherwise the same as that of FIG. 6.

If the method is the agent migration method (step G11), the processing transfers to step F of FIG. 11. If the processing of the steps B to D come to a close, similar processing is repeated to execute the methods in their entirety (steps G12 to G14). The execution of the agent 130 then comes to a close (step G15).

Figure 19:
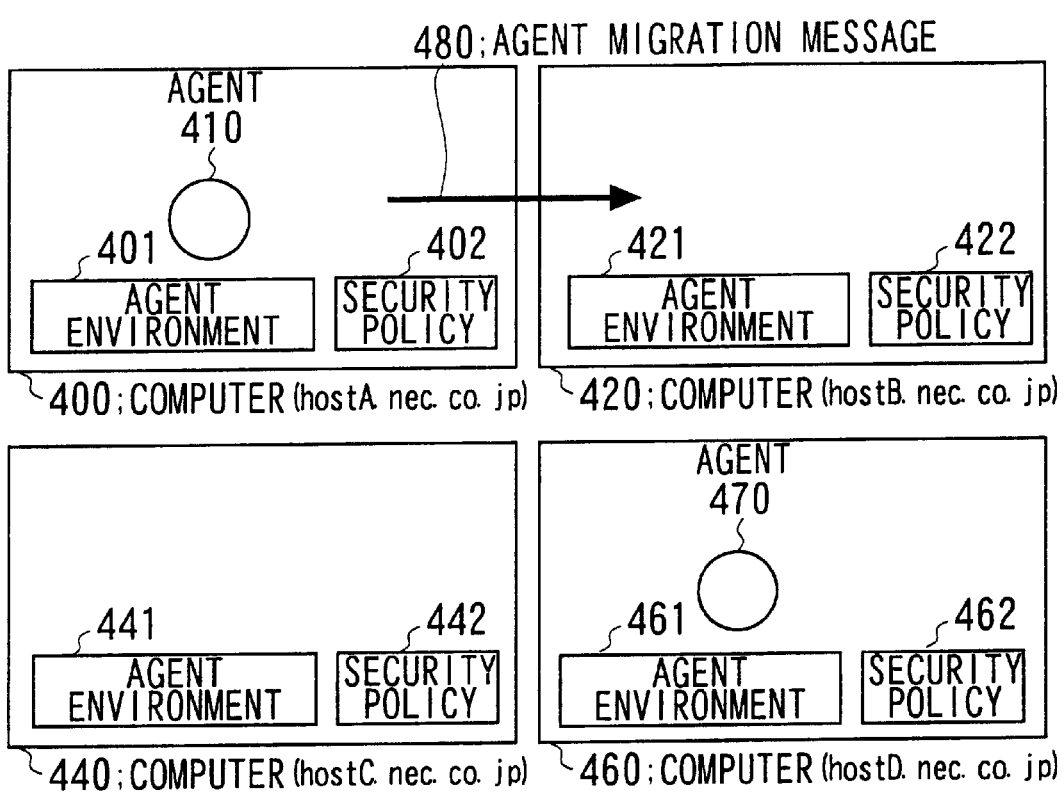
FIG. 19 is a schematic view for illustrating the third embodiment of the present invention.
Figure 20:
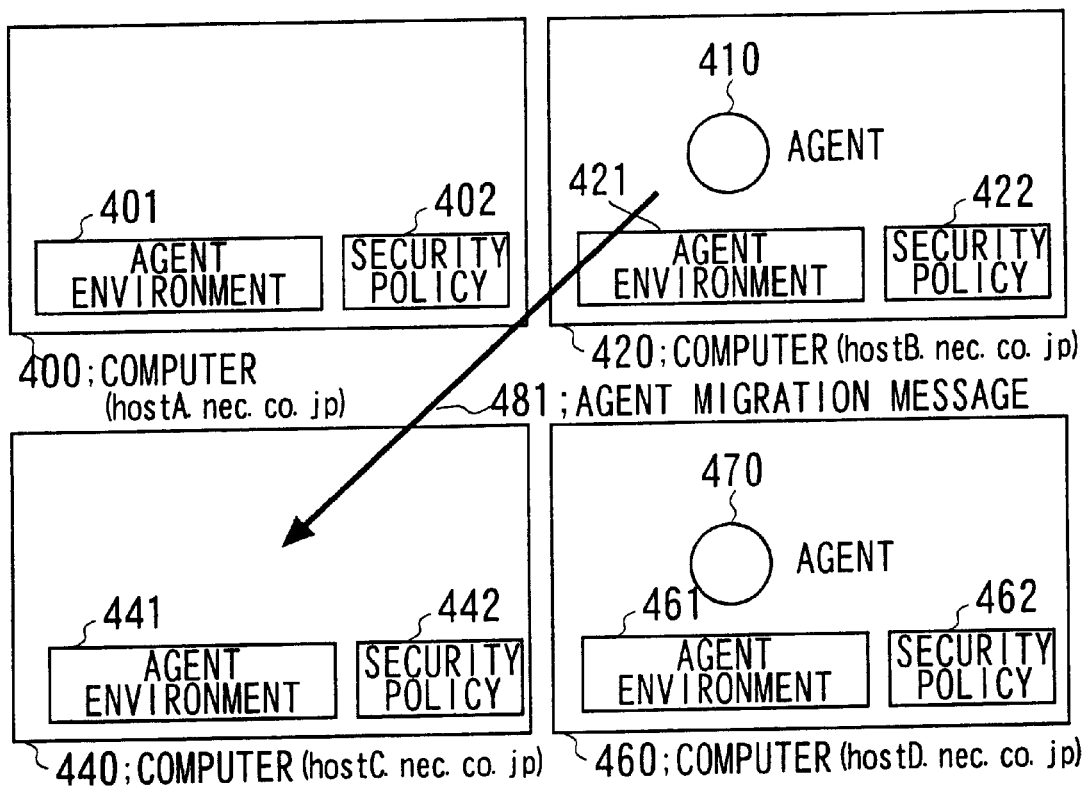
FIG. 20 is a schematic view for illustrating the third embodiment of the present invention.
Figure 21:
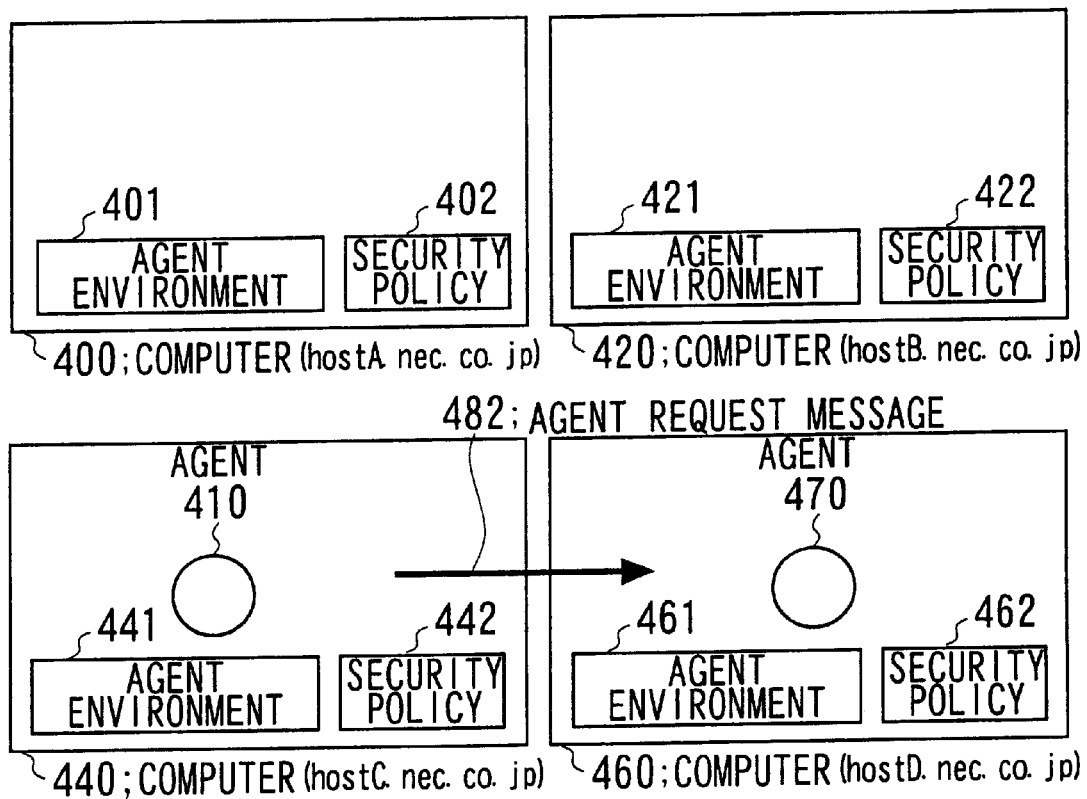
FIG. 21 is a schematic view for illustrating the third embodiment of the present invention.

Referring to FIGS. 19 to 21, the operation of the distributed system 1 of the present embodiment is explained with reference to specified examples.

It is assumed that, in FIG. 19, the user "adminA" of a computer 400, with the URL being "hostA.nec.co.jp" accords the following information to a security policy 402 to start an agent environment 401.

grant code base "*"{
permission MigrationPermission "*.nec.co.jp", "AgentMigrateFrom, AgentMigrateTo";
}; . . . (402a)
grant creator base "*"{
Permission MigrationPermission "*.nec.co.jp", "AgentMigrateFrom, AgentMigrateTo";
}; . . . (402b)
grant visit base "*"{
permission MigrationPermission "*.nec.co.jp", "AgentMigrateFrom, AgentMigrateTo";
}; . . . (402c)

It is also assumed that a Policy identical with the security policy 402 is accorded as a security policy 422 of an agent environment 421 of a computer 420 with the URL being hostB.nec.co.jp.

The following information is given as a security policy 442 to an agent environment 411 of a computer 440, with the URL being "hostC.nec.co.jp".

grant code base "*"{
permission MigrationPermission "*.nec.co.jp", "AgentMigrateFrom"; permission RemotePermission "*", "Call To, CallFrom"
}; . . . (442a)
grant creator base "*"{
permission MigrationPermission "*.nec.co.jp", "AgentMigrateFrom"; Permission RemotePermission "*", "CallTo, CallFrom"
}; . . . (442b)
grant visit base "*"{
permission MigrationPermission "*.nec.co.jp", "AgentMigrateFrom"; permission RemotePermission "*". "CallTo, CallFrom"
}; . . . (442c)

That is, in the agent environment 441, any agent is able to make method transmission/reception to or from other agents and to make agent reception from other agent environments.

An agent environment 461 of a computer 460, with the URL being "hostD.nec.co.jp", accords the following information to a security policy 462.

grant code base "*"{
permission RemotePermission "*", "CallTo, CallFrom";
permission FilePermission "/tmp", "read";
}; . . . (462a)
grant creator base "*"{
permission RemotePermission "*", "CallTo, CallFrom";
permission FilePermission "/tmp", "read";
}; . . . (462b)
grant visit base "*" exceptFor "hostA.nec.co.jp"{
permission RemotePermission "*", "CallTo, CallFrom";
permission FilePermission "/tmp", "read";
};. . . (462c)

That is, in the agent environment 461 of the computer 460, if the thread or agent has not traversed (routed) the agent environment "hostA. nec. co. jp", an authorization to read/tmp file and an authorization to transmit/receive a method are accorded to any agent.

In FIG. 19, an agent environment 421 is started by a user "adminB" of a computer 420 in accordance with a security policy 422, whilst an agent environment 441 is started by the user "adminC" in accordance with security policy 442.

Further, an agent environment 461 is started by a user "adminD" of a computer 460 in accordance with a security policy 462, such that an agent having a disclosed method is in operation on the agent environment 461.

In FIG. 19, the user "userA" of the computer 400 starts a user 410 on the agent environment 401. In the execution program of the agent 410 is stated a program which sequentially executes agent environment 401→migration to agent environment 421 agent environment 421→migration to agent environment 441 method request to agent 470.

In FIG. 19, the agent 410 migrates to the agent environment 421. Upon this time, in a migration message 480 are stored the agent information "userA" and the agent environment information "adminA", "hostA.nec.co.jp".

The agent environment 421 receives the migration message 480 to check for the migration authorization from the agent information "userA" and the agent environment information ("adminA", "hostA.nec.co.jp"). Since any agent migration is received in the agent environment 421, agent migration of the agent 410 to the agent environment 421 is permitted and restored to reinstate the execution.

In FIG. 20, the agent 410 migrates to an agent environment 441. In a migration message 481 at this time are stored, in addition to data on the agent 410, the agent information "userA", the agent environment information ("adminB", "hostB.nec.co.jp") and the agent visit history information ("adminA", "hostA.nec.co.jp").

The agent environment 441 receives the migration message 481 to check into the migration executing authorization from the agent information "userA", and the agent visit history information ("adminB", "hostB.nec.co.jp" and "adminA" "hostA.nec.co.ip"). Since any agent migration is received in the agent environment 341 agent migration of the agent 310 to the agent environment 341 is permitted and restored to reinstate the execution.

Referring to FIG. 21, the agent 410 transmits an execution request message 482 of a method (s) disclosed by the agent 470.

In the agent environment 441, method transmission/reception to or from the agent environment 461 is permitted.

In the execution request message 482, there are stored the agent information "userA", agent environment ("adminC", "hostC.nec.co.jp") and the agent visit information ("adminB", "hostB.nec.co.jp" and "adminA", "hostA.nec.co.jp").

The agent environment 461 receives a method request message 482 to check into the agent information "userA" and the thread visit history information ("adminC", "hostC.nec.co.jp" "adminB", "hostB.nec.co.jp" and "adminA", "hostA.nec.co.jp").

Since a method call reception from host B.nec.co.jp is not permitted in the agent environment 461, no method execution authorization is accorded so that an error message is returned.

The operation and the meritorious effect of the present third embodiment is now explained.

Since the present second embodiment is configured for adding an agent environment information to the agent visit history information and saved each time an agent migration occurs, it is possible to prohibit execution of a specified method to an agent which has visited an untrustable agent environment. In case of a method request, the agent history information is added to the thread visit history and transmitted to reflect the agent history, so that execution of a thread which has traversed an untrustable agent environment can be prohibited in communication.

By defining the security policy derived from an own (or unique) judgment, a supervisor of each agent environment is able to realize delicate and flexible access control, as in the previous embodiments. Moreover, the security strength of a multi-agent system can be adjusted easily. In addition, the agent environment or agents operating thereon can be protected from an agent with a malicious intention such as an intension of attacking other agent environments through agent environments with loose security, and thus a safe multi-agent system can be constructed.

Figure 22:
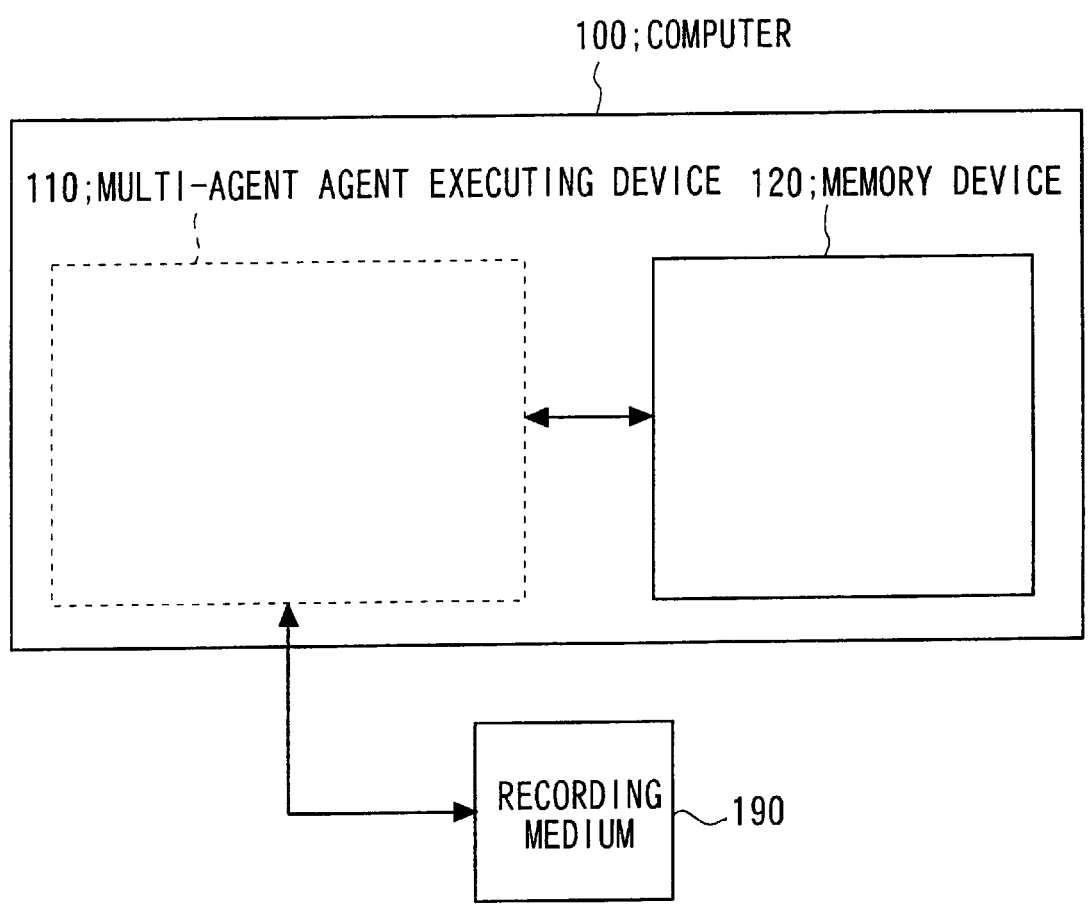
FIG. 22 shows the structure of a fourth embodiment of the present invention.
Figure 23:
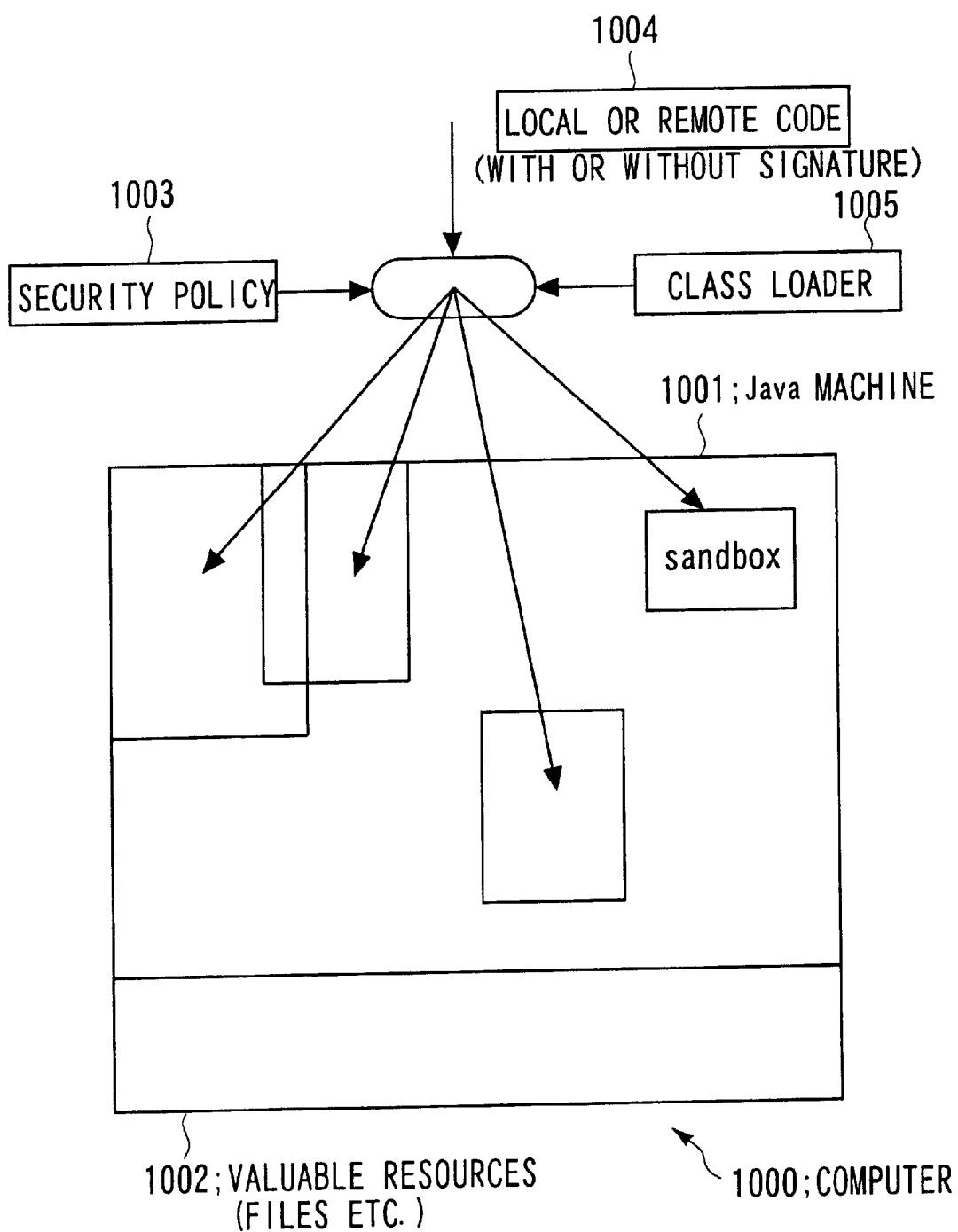
FIG. 23 is a block diagram showing the structure of a conventional computer.

A fourth embodiment of the present invention is hereinafter explained. FIG. 22 shows the structure of the present fourth embodiment. Referring to FIG. 22, showing the present fourth embodiment, a computer 100 constituting a distributed system 1 includes a multi-agent executing device 110, a storage device 120 and a recording medium 190 having an agent access control program recorded thereon. This recording medium 190 may be a magnetic disc, a magneto-optical disc, semiconductor memory, or other recording mediums. The recording medium 190 may also be a recording medium of another server accessed through a communication medium.

The access control program is read, from the recording medium 190 into a multi-agent execution device 110 to control the operation of the multi-agent executing device 110 to generate in the storage device 120 storage units (or areas) for a security policy 121, agent storage unit 122, agent information 123 and the agent environment information 124 and, in certain embodiments, a thread visit history information 125 and the agent visit history information 125, respectively.

The multi-agent executing device 110 executes the processing identical with the processing by the multi-agent device of the first to third embodiments under control by the automatic access control program.

That is, the access control program is a program for implementing the processing functions on a computer of the multi-agent executing device 110. Such processing functions include the agent management means 150, constituting the agent environment, agent generating means 160, execution method management means 171, agent information management means 172, agent environment management means 173, thread visit history management means 174 or agent visit history management means 175, method transmission/reception means 180, 181, and agent transmission/reception means 182, 183.

Of course, the computers making up the distributed system are not limited to the four computers shown in FIG. 1. There is also no limitation to the number of the computers of the distributed system 1. The communication network may be a cable network or wireless, as desired.

Also, plural agent environments can be started in each computer without limitations. If necessary, limitations may be imposed on the number of agent environments in the security policy.

On each agent environment, plural agents can be in operation simultaneously. If necessary, limitations may be imposed on the number of agents in the security policy.

The meritorious effects of the present invention are summarized as follows.

According to the present invention, as described above, in which a security policy is defined from one agent environment to another, and in which not only the formulator and the starter of an agent of the source of method request but also the agent environment traversed by the method is preserved and updated each time the method traverses the agent environment, execution of a thread which has traversed an untrustable agent environment can be inhibited in communication.

By defining the security Policy derived from an own judgment, a supervisor of each agent environment is able to realize delicate and flexible access control, as in the previous embodiments.

Moreover, the security strength of a multi-agent system can be adjusted easily. In addition, the agent environment or agents operating thereon can be protected from an agent with a malicious intention such as the intension of attacking agent environments via other agent environments having a loose security, so that a safe multi-agent system can be constructed.

Also, according to the present invention, in which the agent environment through which an agent is migrated is added and preserved every agent migration, it is possible to prohibit an agent visiting an untrustable agent environment from executing a specified method, as a result of which the agent environment can be protected to enable a multi-agent system with high trustability.

Moreover, according to the present invention, leakage of confidential information on the agent environment can be prohibited to enable a multi-agent system with high security.

In addition, according to the present invention, the agent environment information is added to the agent visit history information and stored every agent migration, so that an agent which has traversed untrustable agent environments can be prohibited from execution. Moreover, in case of a method request, the agent history information is added to the thread visit history for transmission to reflect the agent history to render it possible to prohibit execution of a thread which has traversed untrustable agent environments even in communication.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An access control apparatus having an agent environment for executing one or more agents each having method executing means and for managing execution of said agent(s), wherein
   (a) said agent environment comprises:
   (a1) agent generating means for generating said agent;
   (a2) agent management means for uniquely distinguishing and managing said agent from another agent in said agent environment as from generation until end of execution of said agent;
   (a3) execution method management means for checking as to whether or not the method executed by said agent is in need of access control;
   (a4) agent environment information management means for storing managing position information of said agent environment, a starter of said agent environment and a producer of an execution program of said agent environment, as agent environment information, upon startup of said agent environment, and for collating the agent environment information with a security policy proper to said agent environment to check into authorization of executing method of an agent operating on said agent environment;
   (a5) agent information management means for storing and managing the information on a starter of said agent and a producer of said agent as agent information upon generation of said agent, and for collating said agent information with the security policy proper to said agent environment to check into the authorization of said executing method of said agent;
   (b) wherein first method transmission means and first method reception means are provided in the access control apparatus;
   (c) wherein the apparatus is configured such that:
   (c1) when a first agent present in the first one of said plural agent environments makes a method execution request to a second agent having a method to be disclosed to another agent,
   (c2) said first agent information management means of the first agent environment discriminates the agent information on the first agent environment and collates the discriminated information with the security policy of said first agent environment to check into a transmission authorization of said method for said first agent and,
   (c4) when said first agent has an authorization to transmit said method, the first method transmission means transmits, along with the execution request of said method, the first agent information and an updated thread visit history information on an executed thread of said method of said first agent added with the agent environment information of said first agent by a first thread visit history management means of the first agent environment,
   (c5) said first method reception means receiving a reply to said method execution request;
   (d) wherein said second agent environment where said second agent is present comprises:
   (d1) second reception means for receiving said method execution request transmitted from said first method transmission means, said first agent information and said thread visit history information;
   (d2) second agent information management means for reading said first agent information and collating the read information with the security policy of said second agent environment to check into the execution authorization of said method;
   (d3) second thread visit history management means for reading and discriminating the updated thread visit history information and collating the read information with the security policy of said second agent environment to check into the execution authorization of said method; and
   (d4) second method transmission means for returning a result of execution of said method to said first agent environment.

2. An access control apparatus, capable of executing a plurality of agents having method executing means, comprising:
   an agent environment managing execution of said agent;
   said agent environment migrating said agent from a first agent environment, in which said agent operates, to a second agent environment in which said agent is restored to continue the execution;
   said agent environment comprising:
   agent generating means for generating an agent;
   agent management means for uniquely distinguishing and managing said agent from other agents in said agent environment as from generation until end of execution of said agent;
   execution method management means for checking as to whether or not a method executed by said agent is in need of access control;
   agent environment information management means for storing and managing position information of said agent environment information on a starter of said agent environment and a producer of an execution program of said agent environment, as agent environment information, upon startup of said agent environment, and collating the agent environment information with a security policy proper to said agent environment to check into authorization of executing method of the agent operating on said agent environment; and
   agent information management means for storing and managing the information on the starter of said agent and the producer of said agent program as the agent information upon generation of said agent, and collating said agent information with the security policy proper to said agent environment to check into the authorization of said executing method of said agent;

a first one of said agent environments comprising:
  first agent information management means for discriminating the agent information of said agent when said agent is migrating to said second agent environment, to collate the agent information of said agent with the security policy of said first agent environment to check into the migration execution authorization of said agent;
  first agent environment information management means for discriminating said first agent environment information for collating the security policy of said first agent environment to check into the migration execution authorization of said first agent;
  first agent visit history management means for discriminating the agent visit history information of said agent for collating the discriminated information with the security policy of said first agent environment to check into the migration execution authorization of said agent; and
  first agent transmission means for transmitting said agent information and an updated information to said second agent environment along with the agent migration request in case the agent has migration executing authorization, said updated visit history information being obtained by adding the agent environment information of said first agent environment to the agent visit history information of said agent by said first agent visit history information management means of said first agent environment; and
said second agent environment comprising:
  second agent reception means for reception the agent migration request transmitted from said first agent transmission means and the updated agent visit history information;
  second agent information management means for reading and discriminating the agent information and collating the discriminated information to a security policy of the second agent environment to check into the migration authorization of said agent; and
  second agent visit history information management means for reading and discriminating the agent visit history information and collating the information with the security policy of the second agent environment to check into the migration authorization of said agent.

3. The access control apparatus according to claim 2, further comprising:
  first method transmission means;
  said first method transmission means being configured such that, in a first agent environment where a first agent is present and makes a method execution request to a second agent having a method to be disclosed to another agent:
    when said first agent makes said method execution request, said first method transmission means discriminates the agent information on said first agent environment and collates the discriminated information with the security policy of said first agent environment to check into a transmission authorization of said method by said first agent and, said first agent environment information management means discriminates said agent environment information on said first agent environment and collates the discriminated agent environment information with the security policy of said first agent environment to check into a transmission authorization of said method by said agent, and
    when said first agent has authorization to transmit said method, said first agent transmits, along with said method execution request, the first agent information and said updated thread visit history information to said second agent environment;
  first method reception means receiving a reply to said method execution request;
  said second agent environment, where said second agent is present, comprising:
    second method reception means for receiving said method execution request, said first agent information, and said thread visit history information;
    second agent information management means for reading said first agent information and collating the read information with the security policy of said second agent environment to check into the execution authorization of said method;
    second thread visit history management means for reading and discriminating the updated thread visit history information and collating the read information with the security policy of said second agent environment to check into the execution authorization of said method; and
    second method transmission means for returning a result of execution of said method to said first agent environment.

4. An access control process having an agent environment for executing plural agents having a method executing step and for managing execution of said agent, said agent environment comprising:
  an agent generating step of generating an agent;
  an agent management step of uniquely distinguishing and managing said agent from another agent in said agent environment as from generation until end of execution of said agent;
  an execution method management step of checking as to whether or not the method executed by said agent is in need of access control;
  an agent environment information management step of storing and managing position information of said agent environment, a starter of said agent environment and a producer of an execution program of said agent environment, as agent environment information, upon startup of said agent environment, and for collating the agent environment information with a security policy proper to said agent environment to check into authorization, for executing said method, of the agent operating on said agent environment; and
  an agent information management step of storing and managing the information on the starter of said agent and on the producer of said agent program as the agent information upon generation of said agent, and collating said agent information with the security policy proper to said agent environment to check into the authorization, for executing said method, of said agent;
  said first agent environment comprising:
    a first agent environment management step of, in the first agent environment, discriminating the agent information of said first agent to collate the agent information of said agent with a security policy of said first agent environment to check into method transmitting authorization of said first agent, when the first agent existing in the first agent environment makes a method execution request to a second agent having a method to be disclosed to another agent;

a first agent environment information management step of discriminating said agent environment information on the first agent environment for collating the security policy of said first agent environment to check into the method transmitting authorization of said first agent;

a first method transmitting step of transmitting, along with said method execution request, said first agent information and updated thread visit information, when said first agent has said method transmitting authorization, said updated thread visit information being obtained by adding said agent environment information of the first agent to thread visit history information on an executed thread of said method of the first agent in a first thread visit history management step of the first agent environment;

a first method reception step of receiving a reply to said method execution request;

a second agent environment in which a second agent is present comprising:
   a second agent reception step of receiving the agent execution request transmitted from the first agent transmitting step, said first agent information and the updated thread visit history information;
   a second agent information management step of reading and discriminating the updated thread visit history information, and collating a security policy of the second agent environment to check into execution authorization of said agent;
   a second thread visit history information management step of reading and discriminating the thread visit history information, and collating the discriminated information with the security policy of the second agent environment to check into the migration authorization of said method; and
   a second method transmitting step of transmitting an executed result of said method.

5. An access control process having an agent environment in which to execute one or plural agents having a method executing step and in which to manage the execution of said agent; said method being capable of migrating said agent from a first agent environment in which said agent is operated to a second agent environment for restoring said agent to continue the execution;

said agent environment comprising:
   (a) an agent generating step of generating an agent;
   (b) an agent management step of uniquely distinguishing and managing said agent from the other agents in said agent environment as from generation until end of execution of said agent;
   (c) an execution method management step of checking as to whether or not a method executed by said agent is in need of access control;
   (d) an agent environment information management step of storing and managing position information of said agent environment, a starter of said agent environment and a producer of an execution program of said agent environment, as agent environment information, at the time of startup of said agent environment, and collating the agent environment information to a security policy proper to said agent environment to check into authorization, for executing the method, of the agent operating in said agent environment; and
   (e) an agent information management step of storing and managing the information on the starter of said agent and the producer of said agent program as agent information upon generation of said agent, and collating said agent information with the security policy proper to said agent environment to check into the authorization of executing the method of said agent;

said first agent environment comprising;
   (f) a first agent information management step of discriminating the agent information of said agent when said agent migrates to the second agent environment and collating the agent information with a security policy of the first agent environment to check into migration executing authorization of said agent;
   (g) a first agent environment information management step of discriminating the first agent environment information with collate it with the security policy of the first agent environment to check into the migration execution authorization of said first agent;
   (h) a first agent visit history management step of discriminating the agent visit history information of said agent to collate it to the security policy of the first agent environment to check into the migration execution authorization of said agent; and
   (i) a first agent transmitting step of transmitting to a second agent environment the first agent information along with the agent executing request, in case said first agent has an agent transmitting authorization, and an updated thread visit history information in the first agent visit history information of the first agent environment, said updated agent visit history information being obtained by adding agent environment information of said first agent environment to the agent visit history information of said agent; and the second agent environment comprising:
   (j) a second agent reception step of receiving the agent migration request transmitted from the first agent transmitting step, and said updated agent visit history information;
   (k) a second agent information management step of reading and discriminating the agent information, and collating a security policy of the second agent environment to check into execution authorization of said agent;
   (l) a second agent visit history information management step of reading and discriminating said agent visit history information and collating this information with the security policy of the second agent environment to check into the migration authorization of said agent.

6. The access control process according to claim 5 comprising:

a first method transmission step and a first method reception step;

said first method transmission step being configured such that:
   in a first agent environment where a first agent is present that makes a method execution request to a second agent having a method to be disclosed to another agent, when said first agent present in the first agent environment makes said method execution request to said second agent,
   said first method transmission step comprising the sub steps of:

(m) a first agent information management step of the first agent environment discriminating the agent information of said first agent to collate the agent information with a security policy of said first agent environment to check into the method transmitting authorization of said first agent;

(n) said first agent environment information management step of the first agent environment discriminating said agent environment information on the first agent environment for collating the security policy of said first agent environment to check into the method transmitting authorization of said first agent;

(o) the first method transmission step of transmitting to a second agent environment the first agent information, along with the method executing request in case said first agent has the method transmitting authorization, and the updated thread visit history information in the first thread visit history information of the first agent environment, said updated thread visit history information being obtained by adding the agent environment information of said first agent to thread visit history information on an executed thread of the method of the first agent;

(p) the first method reception step receiving a reply to the method execution request; and the agent environment in which said second agent is present comprising:

(q) a second method reception step of receiving the method execution request transmitted from the first method transmitting step, said first agent information and the updated thread visit history information;

(r) a second agent information management step of reading and discriminating the first agent information, and collating the security policy of the second agent environment to check into the execution authorization of said method;

(s) a second thread visit history information management step of reading and discriminating the thread visit history information and collating the information with the security policy of the second agent environment to check into the execution authorization of said method; and (t) a second method transmitting step of returning a result of execution of said method to the first agent environment.

7. A computer-readable program product carried on a medium for execution on a plurality of computers connected to other computers over a network, said computers having an agent environment for executing plural agents having a method executing step and managing the execution of said agent, wherein said program product comprising the following processing steps (a) to (m):

said agent environment comprises:

(a) an agent generating processing of generating an agent;

(b) an agent management processing of uniquely distinguishing and managing said agent from the other agents in said agent environment as from generation until end of execution of said agent;

(c) an execution method management processing of checking as to whether or not a method executed by said agent is in need of access control;

(d) an agent environment information management processing of storing and managing position information of said agent environment, a starter of said agent environment and a producer of an execution program of said agent environment, as agent environment information, at the time of startup of said agent environment, and collating the agent environment information with a security policy proper to said agent environment to check into authorization, for executing the method, of the agent operating in said agent environment; and (e) an agent information management processing of storing and managing the information on the starter of said agent and the producer of said agent program as agent information upon generation of said agent, and collating said agent information to the security policy proper to said agent environment to check into the authorization of executing the method of said agent;

when a first agent existing in the first agent environment makes a method execution request to a second agent having a method to be disclosed to another agent, said agent environment comprising:

(f) a first agent environment management processing of the first agent environment discriminating the agent information of said first agent, and collating the agent information with the security policy of said first agent environment to check into the method transmitting authorization of said first agent;

(g) a first agent environment information management processing of the first agent environment discriminating said agent environment information on the first agent environment for collating the security policy of said first agent environment to check into the method transmitting authorization of said first agent;

(h) a first method transmitting processing of transmitting to a second agent environment, along with the method executing request in case said first agent has the method transmitting authorization, the first agent information and updated thread visit history information in the first thread visit history information of the first agent environment, said updated thread visit history information being obtained by adding the agent environment information of said first agent to thread visit history information on an executed thread of said method of said first agent; and (i) a first method reception processing of receiving a reply to the method execution request;

the agent environment in which said second agent is present comprising:

(j) a second method reception processing of receiving the method execution request transmitted from the first method transmitting processing, said first agent information and the updated thread visit history information;

(k) a second agent information management processing of reading and discriminating the first agent information, and collating the information with the security policy of the second agent environment to check into the execution authorization of said method;

(l) a second thread visit history information management processing of reading and discriminating the agent visit history information and collating the information with the security policy of the second agent environment to check into the execution authorization of said method; and (m) a second method transmitting processing of returning a result of execution of said method to the first agent environment.

8. A computer-readable program product carried on a medium for execution on a plurality of computers connected to other computers over a network, said computers having an agent environment for executing plural agents having a method executing step and managing the execution of said agent, said agent being migrated from a first agent environment in which said agent operates to a second agent environment in which said agent is restored and continues to be executed;

said program product comprising the following processing steps of (a) to (l):

wherein said agent environment comprises:
(a) an agent generating processing of generating an agent;
(b) an agent management processing of uniquely distinguishing and managing said agent from the other agents in said agent environment as from generation until end of execution of said agent;
(c) an execution method management processing of checking as to whether or not a method executed by said agent is in need of access control;
(d) an agent environment information management processing of storing and managing position information of said agent environment, a starter of said agent environment and a producer of an execution program of said agent environment, as agent environment information, at the time of startup of said agent environment, and collating the agent environment information with a security policy proper to said agent environment to check into authorization, for executing the method, of the agent operating in said agent environment; and
(e) an agent information management processing of storing and managing the information on the starter of said agent and the producer of said agent program as agent information upon generation of said agent, and collating said agent information with the security policy proper to said agent environment to check into the authorization, for executing the method, of said agent;

said first agent environment comprising:
(f) a first agent information management processing of discriminating the agent information of said agent when said agent is migrated to the second agent environment and collating the agent information with a security policy of the first agent environment to check into the migration executing authorization of said agent;
(g) a first agent environment information management processing of discriminating the first agent environment information with collate it with the security policy of the first agent environment to check into the migration execution authorization of said first agent;
(h) a first agent visit history management processing of discriminating agent visit history information of said agent to collate it with the security policy of the first agent environment to check into the migration execution authorization of said agent; and (i) a first agent transmitting processing of transmitting to a second agent environment, along with the agent executing request in case said first agent has the agent transmitting authorization, the first agent information and updated agent visit history information in the first agent visit history management processing of the first agent environment, said updated agent visit history information being obtained by adding the agent environment information of said first agent to the agent visit history information of said first agent;

the second agent environment comprising:
(j) a second agent reception processing of receiving the agent execution request transmitted from the first agent transmitting processing, said first agent information and the updated agent visit history information;
(k) a second agent information management processing of reading and discriminating the first agent information, collating the security policy of the second agent environment to check into the migration authorization of said agent; and
(l) a second agent visit history information management processing of reading and discriminating the agent visit history information and collating the information with the security policy of the second agent environment to check into the migration authorization of said agent.

9. The computer-readable program product as defined in claim 8 wherein said program product comprises:

first method transmission processing and first method reception processing;

in said first method transmission processing, when the first agent present in the first agent environment makes a method execution request to the second agent having the method to be disclosed to another agent,
(m) a first agent environment management processing of the first agent environment discriminating the agent information on said first agent to collate the agent information with the security policy of said first agent environment to check into the method transmitting authorization of said first agent;
(n) a first agent environment information management processing discriminating said agent environment information on the first agent environment for collating it with the security policy of said first agent environment to check into the method transmission authorization of said first agent;
(o) a first method transmitting processing of transmitting to a second agent environment, along with the method executing request in case said first agent has the method transmitting authorization, the first agent information and the updated thread visit history information in the first thread visit history information of the first agent environment, said updated thread visit history information being obtained by adding the agent environment information of said first agent to the thread visit history information on the method execution thread of said first agent; and
(p) the first method reception processing receiving a reply to the method execution request;

the second agent environment in which said second agent is present comprising:
(q) a second method reception processing of receiving the method execution request transmitted from the first method transmitting processing, said first agent information and the updated thread visit history information;

(r) a second agent information management processing of reading and discriminating the first agent information, and collating it with the security policy of the second agent environment to check into the execution authorization of said method;

(s) a second thread visit history management processing of reading and discriminating the thread visit history information and collating the information with the security policy of the second agent environment to check into the execution authorization of said method; and (t) a second method transmitting processing of returning a result of execution of said method to the first agent environment.

10. An access control process in which a method and/or an agent is sent from one computer to another computer over a network for execution, comprising:

holding and transmitting visit history information on agent environments of computers traversed by a method and/or an agent, collating, in an agent environment of a destined computer, the visit history information, with a security policy defining the security information, and performing control so as not to permit execution of a method and/or an agent which has traversed an agent environment not permitted under a security policy of an own agent environment; and wherein the visit history information comprises migration message information on each agent environment previously traversed by the method and/or agent.

11. An access control process for an agent system, in wich a plurality of computers is interconnected over a network and in which a method disclosed by an agent of a computer is requested to be executed by an agent of another computer, comprising:

storing and holding a security policy which defines security information from one agent environment to another by each computer;

updating and holding, in a method request message:
information on an agent of a method execution requester,
information on an agent environment traversed by the method, and
visit history information, on a thread of said method, to transmit the resulting message to an agent environment of the method execution requester, and
performing control in an agent environment to which of the method execution is requested so as not to permit execution of a thread which has traversed an agent environment not permitted under a security policy on an own agent environment, by collating the visit history information of said thread of the received method request message with the security policy; and wherein the visit history information comprises migration message information on each agent environment previously traversed by the method and/or agent.

12. An access control process, in a mobile agent system in which an agent is migrated between agent environments of a plurality of computers interconnected over a network, comprising:

storing and holding by each computer a security policy defining security information from one agent environment to another;

every time an agent traverses an agent environment, updating and holding agent environment information and agent visit history information in an agent migration message; and collating, in an agent environment of a destination of agent movement, the agent visit history information of a received agent migration message with a security policy to perform control so as not to permit execution of an agent which has traversed an agent environment not permitted by the security policy of an own agent environment; and wherein the visit history information comprises migration message information on each agent environment previously traversed by the method and/or agent.

13. A distributed system comprising:

a plurality of computers interconnected over a network, in which a method disclosed by an agent of a computer is requested by an agent of another computer to be executed;

each computer including storage means for holding security policy defining security information from one agent environment to another;

in an agent environment of a method execution requestor, means for storing in a method request message:
agent information,
agent environment information or, and
visit history information on a method thread;
in an agent environment which the method has traversed, means for holding agent environment information added to the thread visit history information of the method request message; and
in an agent environment of an addresee of the method execution request, means for managing control by collating the visit history information of said thread of the received method request message with a security policy of an own agent environment so as not to permit execution of a thread which has traversed a non-permitted agent environment; and
wherein the visit history information comprises migration message information on each agent environment previously traversed the method and/or agent.

14. A distributed system in which a plurality of computers are interconnected over a network and in which an agent is migrated between agent environments of the computers for execution, wherein:

(a) each computer includes storage means for holding a security policy defining security information from one agent environment to another; and (b) the system comprises:
(b1) means for adding agent visit history information with an agent environment to update an agent migration message each time an agent traverses the agent environment; and
(b2) means for collating the agent visit history information of a received agent migration message with a security policy of an own agent environment to check into migration authorization of the agent, thereby managing control so as not to permit execution of an agent which has traversed an agent environment not permitted by said security policy; and (c) the visit history information comprises migration message information on each agent environment previously traversed by the method and/or agent.

15. An access control method for a distributed system in which a plurality of computers are interconnected over a network; wherein each computer stores and holds a security policy defining security information of each agent environment; and said method comprises:

(a) a step of having reference to said security policy to check into transmission authorization of a method request upon requesting another agent environment which has disclosed a method for executing the method;

(b) a step of adding a thread visit history information on the method execution thread to an own agent environment information in an agent environment traversed by said agent and a source of transmission of the agent and storing the information in the own agent environment information for transmission; and (c) a step of reading the thread visit history information of the method request message upon receiving the method request from another agent and collating the read information with the security policy of the own agent environment to check into execution authorization of the method; and wherein the visit history information comprises migration message information on each agent environment previously traversed the method and/or agent.

16. An access control method for a distributed system in which a plurality of computers are interconnected over a network; wherein each computer stores and holds a security defining security information of own agent environment;

said method comprises:

(a) a step of having reference to said security policy to check into migration execution authorization of an agent lying in an own agent environment upon migration of the agent to another agent environment of a destination of migration;

(b) a step of storing, in an agent migration message, agent visit history information updated by addition of information of the own anent environment when the migration execution authorization of said agent is found; and (c) a step of reading agent visit history information upon receiving an agent migration message from another agent and collating the read information with a security policy of the own agent environment to check into the migration authorization of the agent; and the visit history information comprises migration message information on each agent environment previously traversed by the method and/or agent.

17. A distributed system, comprising:

a plurality of computers interconnected over a network each computer comprising:

storage means for storing a security policy defining security information of an agent environment of an own computer, and agent execution management means for managing execution of an agent in an agent environment of the own computer;

said agent execution management means comprising:

means for having reference to said security policy to check into transmission authorization of a method request upon making a method request from an agent in an own agent environment to an agent of another agent environment;

means for adding own agent environment information to thread visit history information on the method execution thread of said agent to store the added information along with updated thread visit history information in a method request message; and means for reading the thread visit history information of said method request message upon receiving a method request message from another agent, and for collating the read information with the security policy of the own agent environment to check into the execution authorization of said method.

18. A distributed system, comprising:

a plurality of computers interconnected over a network;

in each computer, storage means for storing a security policy defining security information of an agent environment of an own computer and agent execution management means for managing execution of an agent in the agent environment of the own computer;

wherein said agent execution management means comprises:

means for referring to said security policy when an agent in an own agent environment is migrating to an agent environment of another destination of migration to check into migration executing authorization of said agent;

means for adding agent visit history information updated on addition of the own agent environment in an agent migration message in case said agent has a migration executing authorization for transmission to another agent environment, and means for reading the agent visit history information upon receiving the agent migration message to collate the read information with a security policy of the own agent environment to check into the migration authorization of said agent.

19. A computer program product, comprising:

a medium, and instructions, carried on the medium, for permitting a computer to participate in a system in which each of a plurality of computers interconnected over a network stores and holds a security policy which defines security information of an agent environment of an own computer, the instructions defining operations comprising:

referencing said security policy to check into a transmission authorization of a method request upon making a method execution request to another agent environment which has disclosed a method;

adding agent environment information to thread visit history information on an execution thread of the method of the agent and storing updated thread visit history information in a method request message for transmission; and reading the thread visit history information of the method request message upon receiving the method request from another agent and collating the read information with a security policy of an own agent environment to check into the execution authorization of the method so as not to permit execution of a thread which has traversed an agent environment not permitted by the security policy of the own agent environment.

20. A computer program product, comprising:

a medium, and instructions, carried on the medium, for permitting a computer to participate in a system in which each of a plurality of computers interconnected over a network stores and holds a security policy which defines security information of an agent environment of an own computer, the instructions defining operations comprising:
referring to said security policy when an agent in an own agent environment is migrating to an agent environment of another destination of migration to check into migration executing authorization of said agent;
adding agent visit history information updated on addition of the own agent environment in an agent migration message for transmission to another agent environment in case said agent has the migration executing authorization; and
reading thread visit history information of a method request message upon receiving a method request from another agent and collating the read information with a security policy of an own agent environment to check into the execution authorization of the method so as not to permit execution of a thread which has traversed an agent environment not permitted by the security policy of the own agent environment.

21. A distributed system, comprising:
a plurality of agent environments that execute one or more agents;
each of said agent environments having method executing means; and
each of said agent environments managing execution of said agents;
wherein each said agent environment comprises:
agent generating means for generating said agent;
agent management means for uniquely managing said agent and distinguishing said agent from another agent in said agent environment as from generation until end of execution of said agent;
execution method management means for checking as to whether or not the method executed by said agent is in need of access control;
agent environment management means for:
storing and managing as agent environment information, upon startup of said agent environment: position information of said agent environment, a starter of said agent environment, and a producer of an execution program of said agent environment, and
collating the agent environment information with a security policy proper to said agent environment to check into authorization of an executing method of an agent operating on said agent environment;
agent information management means for storing and managing the information on a starter of said agent and a producer of said agent as agent information upon generation of said agent, and for collating said agent information with the security policy proper to said agent environment to check into the authorization of said execution method of said agent;
first method transmission means; and
first method reception means;
wherein, as for the first method transmission means, a first agent information means is configured such that:
when a first agent present in a first one of said plural agent environments makes a method execution request to a second agent having a method to be disclosed to another agent, the first agent information management means of the first agent environment;
discriminates the agent information on the first agent, and
collates the discriminated agent information with a security policy of said first agent environment to check into a method transmitting authorization of said first agent;
the first agent environment management means of the first agent environment discriminates the agent environment information on the first agent environment, collates this discriminated information with the security policy of the first agent environment to check into the method transmitting authorization of said first agent, and
when said first agent has the method transmitting authorization, the first method transmission means transmits the first agent information and an updated thread visit history information, along with said method execution request, to a second agent environment, said updated thread visit history information comprising a thread visit history information on an executed thread of said method of said first agent added to the agent environment information of said first agent,
wherein said first method reception means receives a reply to said method execution request; and
wherein said second agent environment where said second agent is present comprises:
second reception means for receiving said method execution request transmitted from said first method transmission means, said first agent information and said thread visit history information;
second agent information management means for reading said first agent information and collating the read information with a security policy of said second agent environment to check into execution authorization of said method;
second thread visit history management means for reading the updated thread visit history information for discrimination, and collating the read information with the security policy of said second agent environment to check into the execution authorization of said method; and
second method transmission means for replying executed results of said method to said first agent environment.

22. A distributed system having a plurality of agent environments for executing one or more agents each having method executing means and for managing execution of said agents, for migrating said agent from a first agent environment where said agent operates to a second agent environment in which said agent is restored to continue the execution, wherein:
(a) said agent environment comprises:
(a1) agent generating means for generating said agent;
(a2) agent management means for uniquely distinguishing and managing said agent from another agent in said agent environment as from generation until end of execution of said agent;
(a3) execution method management means for checking as to whether or not the method executed by said agent is in need of access control;

(a4) agent environment management means for storing and managing position information of said agent environment, a starter of said agent environment and a producer of an execution program of said agent environment, as agent environment information, upon startup of said agent environment, and for collating the agent environment information with a security policy proper to said agent environment to check into authorization of an executing method of an agent operating on said agent environment; and (a5) agent information management means for storing and managing the information on a starter of said agent and a producer of said agent as agent information upon generation of said agent, and for collating said agent information with the security policy proper to said agent environment to check into the authorization of said execution method of said agent;

(b) said agent environments comprise a first and second agent environment;

(b1) the first agent environment comprising a first agent information management means for discriminating the agent information of said agent when said agent is migrating to said second agent environment and for collating the agent information of said agent to a security policy of the first agent environment to check into migration execution authorization of said first agent;

(b2) first agent environment information management means for discriminating said first agent environment information and for collating the security policy of said first agent environment to check into migration execution authorization of said first agent;

(b3) first agent visit history information management means for discriminating the agent visit history information and of said agent and for collating the discriminated information with the security policy of said first agent environment to check into the migration execution authorization of said agent; and (b4) first agent transmission means for transmitting said agent information and updated agent visit history information to said second agent environment by adding the agent environment information of said first agent environment to the agent visit history information of said agent through said first agent visit history information management means of said first agent environment along with an agent migration request in case the agent has migration executing authorization to update the agent visit history information;

(b2) said second agent environment comprising:

(b2.1) second agent reception means for receiving the agent migration request transmitted from said first agent transmission means and the updated agent visit history information;

(b2.2) second agent information management means for reading and discriminating the agent information and collating the discriminated information with a security policy of the second agent environment to check into the migration authorization of said agent; and (b2.3) second agent visit history information management means for reading and discriminating the agent visit history information and collating this discriminated information with the security policy of the second agent environment to check into the migration authorization of said agent.

23. The distributed system according to claim 22 comprising:

(c) first method transmission means and first method reception means;

(c1) in the first agent environment where an agent making a method execution request to an agent having a method to be disclosed to another agent is present, (c1.1) said first method transmission means being configured such that:

when a first agent present in the first agent environment makes a method execution request to a second agent having a method to be disclosed to another agent, (c1.2) said first agent information management means discriminates the agent information on said first agent environment and collates the discriminated information with the security policy of said first agent environment to check into a method transmission authorization of said first agent and, (c1.3) said first agent environment management means of the first agent environment discriminates the agent environment information on the first agent environment, and collates the discriminated information with the security policy by the first agent environment to check into the method transmission authorization of the first agent, (c1.4) when said first agent has an authorization to transmit said method, the first method transmission means transmits, along with the method execution request, the first agent information and an updated thread visit history information on the executed thread of said method of said first agent added with the agent environment information of said first agent by means of said first thread, and (c1.5) said first method reception means receives a reply to said method execution request;

(d) said second agent environment where said second agent is present comprising:

(d1) second method reception means for receiving said method execution request transmitted from said first method transmission means, said first agent information and said thread visit history information;

(d2) second agent information management means for reading and discriminating said first agent information and collating the read information with the security policy of said second agent environment to check into the execution authorization of said method;

(d3) second thread visit history management means for reading and discriminating the updated thread visit history information and collating the read information with the security policy of said second agent environment to check into the execution authorization of said method; and (d4) said second method transmission means being configured for replying a result of execution of said method to said first agent environment.

* * * * *